US008676727B2

(12) United States Patent
Suyama et al.

(10) Patent No.: US 8,676,727 B2
(45) Date of Patent: Mar. 18, 2014

(54) ABNORMALITY DIAGNOSIS FILTER GENERATOR

(75) Inventors: Akihiro Suyama, Tokyo (JP); Makoto Sato, Yokohama (JP); Minoru Yonezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 13/071,064

(22) Filed: Mar. 24, 2011

(65) Prior Publication Data
US 2012/0078823 A1 Mar. 29, 2012

(30) Foreign Application Priority Data
Sep. 28, 2010 (JP) ................................ 2010-217241

(51) Int. Cl.
*G06F 15/18* (2006.01)
(52) U.S. Cl.
USPC ............................................................. 706/12
(58) Field of Classification Search
None
See application file for complete search history.

(56) References Cited

U.S. PATENT DOCUMENTS

| 2004/0229198 | A1* | 11/2004 | Boyd et al. ................ 434/236 |
| 2005/0154688 | A1* | 7/2005 | Bolt et al. ..................... 706/14 |
| 2006/0206443 | A1* | 9/2006 | Forman et al. ................ 706/20 |
| 2007/0081712 | A1* | 4/2007 | Huang et al. ................. 382/128 |
| 2008/0010353 | A1* | 1/2008 | Rounthwaite et al. ........ 709/206 |
| 2008/0252513 | A1* | 10/2008 | Inoue et al. ................... 342/175 |
| 2008/0270076 | A1* | 10/2008 | Breed ........................... 702/185 |
| 2009/0037044 | A1* | 2/2009 | Enomoto et al. ............... 701/33 |
| 2009/0043441 | A1* | 2/2009 | Breed ............................. 701/29 |

FOREIGN PATENT DOCUMENTS

| JP | 2003-296851 | | 10/2003 | |
| JP | 2003296851 | A * | 10/2003 | ............ G08B 21/00 |
| JP | 2008-59270 | | 3/2008 | |
| JP | 2008059270 | A * | 3/2008 | |

OTHER PUBLICATIONS

Frederick Gustafsson, "Adaptive Filtering and Change Detection", John Wiley & Sons, 2000.*

* cited by examiner

*Primary Examiner* — Kakali Chaki
*Assistant Examiner* — Fuming Wu
(74) *Attorney, Agent, or Firm* — Oblon, Spivak, McClelland, Maier & Neustadt, L.L.P.

(57) ABSTRACT

Provided is an apparatus determining values of N and K for an abnormality diagnostic logic which makes a diagnosis N times for each diagnosis target by using observation values collected therefrom, and generates a diagnosis result showing that the diagnosis target is abnormal if the diagnosis target is judged to be abnormal K or more times. A calculator calculates average false detection rate $P_{FP}$, average overlooking rate $P_{FN}$, bias level of false detection $M_{FP}$, and bias level of overlooking $M_{FN}$, based on diagnosis result data and inspection result data. A determiner calculates an optimization metric for each combination of values N and K by using the average false detection rate, the bias level of false detection, the average overlooking rate, and the bias level of overlooking, and selects a pair of N and K by which the optimization metric becomes minimum or a threshold value or less.

5 Claims, 19 Drawing Sheets

AN EXAMPLE OF TIME-RELATED DIAGNOSIS RESULT DATA

| DATE AND TIME | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|
| 2010/07/06 0:00 | 0 | 0 | 0 | 0 | 0 | 0 | 0 |
| 2010/07/13 0:00 | 0 | 1 | 0 | 0 | 0 | 0 | 0 |
| 2010/07/20 0:00 | 0 | 0 | 0 | 0 | 0 | 0 | 0 |
| 2010/07/27 0:00 | 0 | 1 | 0 | 0 | 0 | 0 | 0 |
| 2010/08/03 0:00 | 0 | 0 | 0 | 0 | 0 | 0 | 0 |
| 2010/08/10 0:00 | 1 | 0 | 0 | 0 | 0 | 0 | 0 |
| 2010/08/17 0:00 | 1 | 0 | 0 | 0 | 0 | 0 | 0 |
| 2010/08/25 0:00 | 1 | 1 | 0 | 0 | 0 | 0 | 0 |
| 2010/09/01 0:00 | 0 | 0 | 0 | 0 | 0 | 0 | 0 |
| 2010/09/08 0:00 | 0 | 0 | 0 | 0 | 0 | 0 | 0 |
| 2010/09/15 0:00 | 0 | 1 | 0 | 0 | 0 | 0 | 1 |
| 2010/09/22 0:00 | 0 | 0 | 0 | 0 | 0 | 0 | 1 |
| 2010/09/29 0:00 | 0 | 1 | 0 | 0 | 0 | 0 | 1 |

FIG. 3

(A) AN EXAMPLE OF INSPECTION RESULT DATA (COMPLETE DATA)

| DATE AND TIME | DIAGNOSIS TARGET 1 | DIAGNOSIS TARGET 2 | DIAGNOSIS TARGET 3 | DIAGNOSIS TRGET 4 | DIAGNOSIS TARGET 5 | DIAGNOSIS TARGET 6 | DIAGNOSIS TARGET 7 |
|---|---|---|---|---|---|---|---|
| 2010/07/06 10:00 | 0 | 0 | 0 | 0 | 0 | 0 | 0 |
| 2010/07/13 10:00 | 0 | 0 | 0 | 0 | 0 | 0 | 0 |
| 2010/07/20 10:00 | 0 | 0 | 0 | 1 | 0 | 0 | 0 |
| 2010/07/27 10:00 | 0 | 0 | 0 | 1 | 0 | 0 | 0 |
| 2010/08/03 10:00 | 0 | 0 | 0 | 0 | 0 | 1 | 0 |
| 2010/08/10 10:00 | 1 | 0 | 0 | 0 | 0 | 1 | 0 |
| 2010/08/17 10:00 | 1 | 0 | 0 | 0 | 0 | 1 | 0 |
| 2010/08/25 10:00 | 1 | 0 | 0 | 0 | 0 | 1 | 0 |
| 2010/09/01 10:00 | 0 | 0 | 0 | 0 | 0 | 0 | 0 |
| 2010/09/08 10:00 | 0 | 0 | 0 | 0 | 0 | 0 | 0 |
| 2010/09/15 10:00 | 0 | 0 | 0 | 0 | 0 | 0 | 0 |
| 2010/09/22 10:00 | 0 | 0 | 0 | 0 | 0 | 0 | 0 |
| 2010/09/29 10:00 | 0 | 0 | 0 | 0 | 0 | 0 | 0 |

(B) AN EXAMPLE OF INSPECTION RESULT DATA (INCOMPLETE DATA)

| DATE AND TIME | DIAGNOSIS TARGET 1 | DIAGNOSIS TARGET 2 | DIAGNOSIS TARGET 3 | DIAGNOSIS TARGET 4 | DIAGNOSIS 診断対象5 | DIAGNOSIS TARGET 6 | DIAGNOSIS TARGET 7 |
|---|---|---|---|---|---|---|---|
| 2010/07/31 10:00 | 0 | 0 | 0 | 1 | 0 | 0 | 0 |
| 2010/08/31 10:00 | 1 | 0 | 0 | 0 | 0 | 1 | 0 |
| 2010/09/30 11:00 | 0 | 0 | 0 | 0 | 0 | 0 | 0 |

FIG. 4

AN EXAMPLE OF TIME-RELATED DIAGNOSTIC RELIABILITY
FEEDBACK DATA CONCERNING FALSE DETECTION

| DATE AND TIME | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|
| 2010/07/06 0:00 | 0 | 0 | 0 | 0 | 0 | 0 | 0 |
| 2010/07/13 0:00 | 0 | 1 | 0 | 0 | 0 | 0 | 0 |
| 2010/07/20 0:00 | 0 | 0 | 0 | 0 | 0 | 0 | 0 |
| 2010/07/27 0:00 | 0 | 1 | 0 | 0 | 0 | 0 | 0 |
| 2010/08/03 0:00 | 0 | 0 | 0 | 0 | 0 | 0 | 0 |
| 2010/08/10 0:00 | 0 | 0 | 0 | 0 | 0 | 0 | 0 |
| 2010/08/17 0:00 | 0 | 0 | 0 | 0 | 0 | 0 | 0 |
| 2010/08/25 0:00 | 0 | 1 | 0 | 0 | 0 | 0 | 0 |
| 2010/09/01 0:00 | 0 | 0 | 0 | 0 | 0 | 0 | 0 |
| 2010/09/08 0:00 | 0 | 0 | 0 | 0 | 0 | 0 | 0 |
| 2010/09/15 0:00 | 0 | 0 | 0 | 0 | 0 | 0 | 1 |
| 2010/09/22 0:00 | 0 | 1 | 0 | 0 | 0 | 0 | 1 |
| 2010/09/29 0:00 | 0 | 1 | 0 | 0 | 0 | 0 | 1 |

FIG. 5A

AN EXAMPLE OF TIME-RELATED DIAGNOSTIC RELIABILITY FEEDBACK DATA CONCERNING OVERLOOKING

| DATE AND TIME | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|
| 2010/07/06 0:00 | 0 | 0 | 0 | 0 | 0 | 0 | 0 |
| 2010/07/13 0:00 | 0 | 0 | 0 | 0 | 0 | 0 | 0 |
| 2010/07/20 0:00 | 0 | 0 | 0 | 1 | 0 | 0 | 0 |
| 2010/07/27 0:00 | 0 | 0 | 0 | 1 | 0 | 0 | 0 |
| 2010/08/03 0:00 | 0 | 0 | 0 | 0 | 0 | 0 | 0 |
| 2010/08/10 0:00 | 0 | 0 | 0 | 0 | 0 | 1 | 0 |
| 2010/08/17 0:00 | 0 | 0 | 0 | 0 | 0 | 1 | 0 |
| 2010/08/25 0:00 | 0 | 0 | 0 | 0 | 0 | 1 | 0 |
| 2010/09/01 0:00 | 0 | 0 | 0 | 0 | 0 | 0 | 0 |
| 2010/09/08 0:00 | 0 | 0 | 0 | 0 | 0 | 0 | 0 |
| 2010/09/15 0:00 | 0 | 0 | 0 | 0 | 0 | 0 | 0 |
| 2010/09/22 0:00 | 0 | 0 | 0 | 0 | 0 | 0 | 0 |
| 2010/09/29 0:00 | 0 | 0 | 0 | 0 | 0 | 0 | 0 |

FIG. 5B

| DATE AND TIME | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|
| 2010/07/06 0:00 | 0.00 | 0.00 | 0.00 | 0.00 | 0.00 | 0.00 | 0.00 |
| 2010/07/13 0:00 | 0.00 | 1.00 | 0.00 | 0.00 | 0.00 | 0.00 | 0.00 |
| 2010/07/20 0:00 | 0.00 | 1.00 | 0.00 | 0.00 | 0.00 | 0.00 | 0.00 |
| 2010/07/27 0:00 | 0.00 | 0.00 | 0.00 | 0.00 | 0.00 | 0.00 | 0.00 |
| 2010/08/03 0:00 | 0.00 | 0.00 | 0.00 | 0.00 | 0.00 | 0.00 | 0.00 |
| 2010/08/10 0:00 | 0.10 | 0.00 | 0.00 | 0.00 | 0.00 | 0.00 | 0.00 |
| 2010/08/17 0:00 | 0.01 | 0.00 | 1.00 | 0.00 | 0.00 | 0.00 | 0.00 |
| 2010/08/25 0:00 | 0.00 | 1.00 | 0.00 | 0.00 | 0.00 | 0.00 | 0.00 |
| 2010/09/01 0:00 | 0.00 | 0.00 | 0.00 | 0.00 | 0.00 | 0.00 | 0.00 |
| 2010/09/08 0:00 | 0.00 | 1.00 | 0.00 | 0.00 | 0.00 | 0.00 | 0.00 |
| 2010/09/15 0:00 | 0.00 | 1.00 | 0.00 | 0.00 | 0.00 | 0.00 | 1.00 |
| 2010/09/22 0:00 | 0.00 | 1.00 | 0.00 | 0.00 | 0.00 | 0.00 | 1.00 |
| 2010/09/29 0:00 | 0.00 | 1.00 | 0.00 | 0.00 | 0.00 | 0.00 | 1.00 |

FIG. 8A

| DATE AND TIME | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|
| 2010/07/06 0:00 | 0.00 | 0.00 | 0.00 | 0.00 | 0.00 | 0.30 | 0.00 |
| 2010/07/13 0:00 | 0.00 | 0.00 | 0.00 | 0.95 | 0.00 | 0.50 | 0.00 |
| 2010/07/20 0:00 | 0.00 | 0.00 | 0.00 | 0.98 | 0.00 | 0.65 | 0.00 |
| 2010/07/27 0:00 | 0.00 | 0.00 | 0.00 | 1.00 | 0.00 | 0.80 | 0.00 |
| 2010/08/03 0:00 | 0.00 | 0.00 | 0.00 | 0.00 | 0.00 | 0.90 | 0.00 |
| 2010/08/10 0:00 | 0.00 | 0.00 | 0.00 | 0.00 | 0.00 | 0.95 | 0.00 |
| 2010/08/17 0:00 | 0.00 | 0.00 | 0.00 | 0.00 | 0.00 | 0.98 | 0.00 |
| 2010/08/25 0:00 | 0.00 | 0.00 | 0.00 | 0.00 | 0.00 | 1.00 | 0.00 |
| 2010/09/01 0:00 | 0.00 | 0.00 | 0.00 | 0.00 | 0.00 | 0.00 | 0.00 |
| 2010/09/08 0:00 | 0.00 | 0.00 | 0.00 | 0.00 | 0.00 | 0.00 | 0.00 |
| 2010/09/15 0:00 | 0.00 | 0.00 | 0.00 | 0.00 | 0.00 | 0.00 | 0.00 |
| 2010/09/22 0:00 | 0.00 | 0.00 | 0.00 | 0.00 | 0.00 | 0.00 | 0.00 |
| 2010/09/29 0:00 | 0.00 | 0.00 | 0.00 | 0.00 | 0.00 | 0.00 | 0.00 |

FIG. 8B

MODEL PARAMETER TABLE

| m | 7 | | | | | | |
|---|---|---|---|---|---|---|---|
| n | 13 | | | | | | |
| $\beta_{fp}$ | -3.7736 | | | | | | |
| $\beta_{fn}$ | -4.3051 | | | | | | |
| $\sigma_{fp}$ | 1.7881 | | | | | | |
| $\sigma_{fn}$ | 0.3331 | | | | | | |
| $E(\gamma_{fp})$ | -1.3848 | 3.0858 | -0.5919 | -1.3560 | -1.7470 | -0.7230 | 2.3965 |
| $E(\gamma_{fn})$ | -0.4731 | -0.1181 | -0.5393 | -0.0373 | -0.1334 | 2.6956 | -1.2360 |

MODEL GENERATION (UPDATE) TIME IS SET IN 1ST ROW →

LIKELIHOOD TABLE

| Time | $L_{fp}$ | $L_{fn}$ |
|---|---|---|
| 2010/11/01 01:00 | 5.63E-10 | 4.6E-10 |
| 2011/01/01 01:00 | 5.83E-11 | 4.44E-9 |
| 2011/02/01 01:00 | 7.38E-9 | 5.23E-11 |
| ... | ... | ... |
| 2012/03/01 01:00 | 6.60E-15 | 1.28E-16 |
| 2012/04/01 01:00 | 4.33E-18 | 2.22E-20 |
| 2012/05/01 01:00 | 6.23E-20 | 3.36E-19 |

FIG. 10

| ID | n | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|---|
| FP | 13 | 0 | 4 | 0 | 0 | 0 | 0 | 2 |

(A) AN EXAMPLE OF SAMPLE DATA CONCERNING FALSE DETECTION

| ID | n | DIAGNOSIS TARGET 1 | DIAGNOSIS TARGET 2 | DIAGNOSIS TARGET 3 | DIAGNOSIS TARGET 4 | DIAGNOSIS TARGET 5 | DIAGNOSIS TARGET 6 | DIAGNOSIS TARGET 7 |
|---|---|---|---|---|---|---|---|---|
| FN | 13 | 0 | 0 | 0 | 0 | 0 | 3 | 0 |

(B) AN EXAMPLE OF SAMPLE DATA CONCERNING OVERLOOKING

FIG. 13 ically in a latter technique, warning value
ABNORMALITY DIAGNOSIS FILTER GENERATOR

CROSS REFERENCE TO RELATED APPLICATIONS

This application is based upon and claims the benefit of priority from the prior Japanese Patent Application No. 2010-217241, filed on Sep. 28, 2010, the entire contents of which are incorporated herein by reference.

FIELD

The embodiments of the present invention relate to an abnormality diagnosis filter generator for restraining warning errors in a remote abnormality detection system for detecting abnormalities in a diagnosis target, for example.

BACKGROUND

In a remote diagnosis method for diagnosing the abnormality of a target system (air conditioning system, water system, electric power plant, etc.) by remotely monitoring process data of the target system such as a sensor measured value and a control instruction value, it is a general technique to keep the score of diagnosis result as abnormality level to issue an alarm to an observer when the score exceeds a warning value.

When the warning value is set low not to overlook abnormality, the problem of "false detection" frequently occurs, which is because an abnormality alarm is easily issued when the target is normal. On the other hand, when the warning value is set high, the problem of "overlooking" frequently occurs, which is because the target which is actually abnormal is easily judged to be normal.

As a prior art to avoid such problems, it is known to issue a warning when the target is judged to be abnormal a plurality of times within a set period, or to set the warning value automatically.

However, the former technique has a problem that the performance of the diagnostic system depends on the user since the period and judgment frequency should be determined by trial and error.

On the other hand, in the latter technique, warning value parameters can be set automatically, but there is a problem that solution cannot be obtained when the performance of the abnormality diagnosis is not sufficient.

Both of the techniques has an object to set optimum operational parameters for univariate input (diagnosis result or sensor measured value), which leads to a problem that the number operational parameters linearly increases as the number of sensors and the number of diagnosis results increase.

BRIEF DESCRIPTION OF THE DRAWINGS

FIG. 3 is a diagram showing an example of time-related diagnosis result data.

FIG. 4 is a diagram showing an example of time-related inspection result data.

FIG. 5A is a diagram showing an example of time-related diagnostic reliability feedback data concerning false detection.

FIG. 5B is a diagram showing an example of time-related diagnostic reliability feedback data concerning overlooking.

FIG. 8A is a diagram showing an example of time-related diagnostic reliability feedback data concerning false detection.

FIG. 8B is a diagram showing an example of time-related diagnostic reliability feedback data concerning overlooking.

FIG. 10 is a diagram showing a structural example of the data stored in a diagnostic logic evaluation model storage.

FIG. 13 is a diagram showing structural examples of sample data concerning false detection and overlooking respectively.

DETAILED DESCRIPTION

Figure 1:
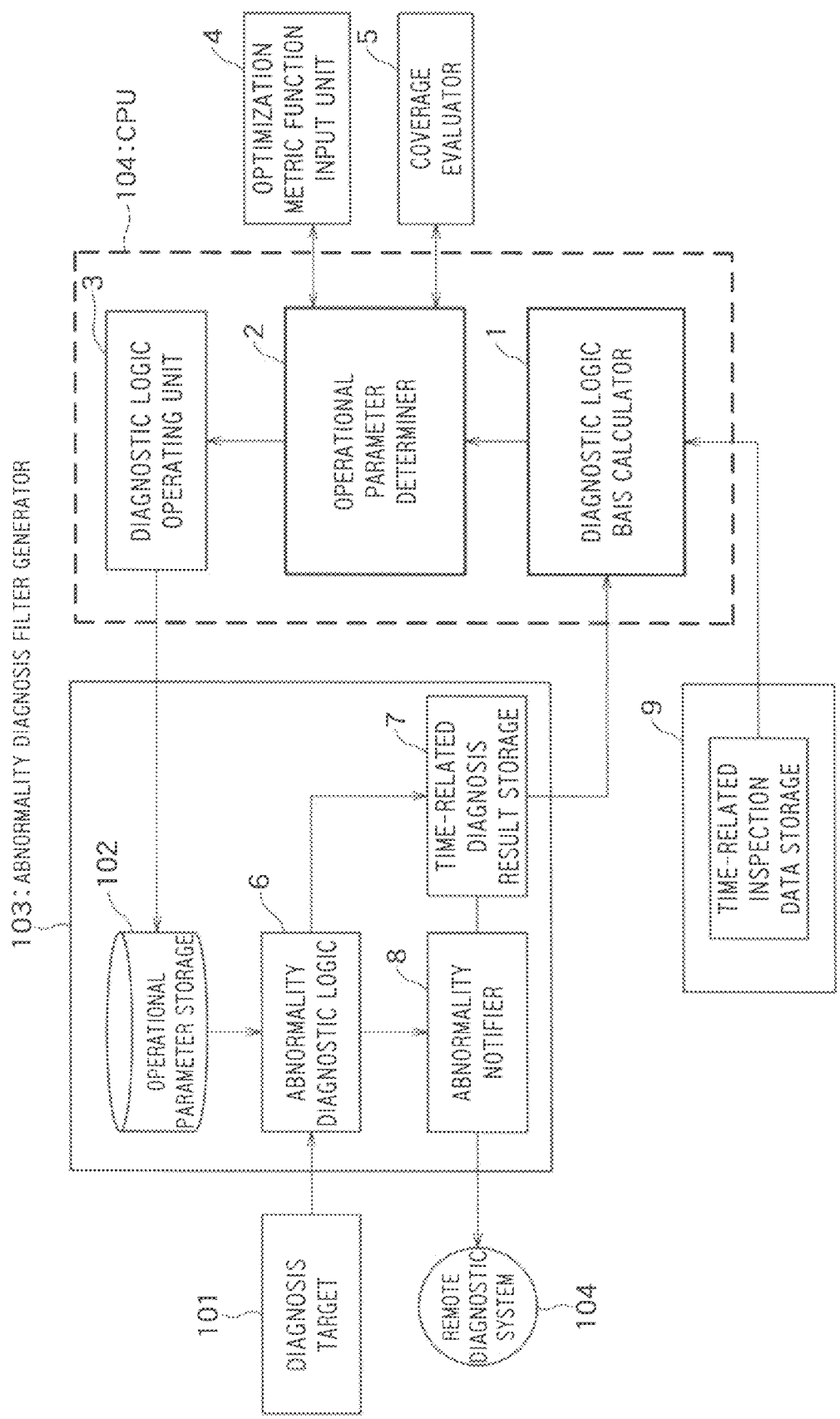
FIG. 1 is a block diagram of an abnormality diagnosis system including an abnormality diagnosis filter generator according to an embodiment of the present invention.

According to one aspect of the embodiments, there is provided an abnormality diagnosis filter generator determining values of N and K for an abnormality diagnostic logic which makes a diagnosis N (an integer of 2 or greater) times with respect to each diagnosis target by using observation values collected from the diagnosis targets, and generates a diagnosis result showing that the diagnosis target is abnormal if the diagnosis target is judged to be abnormal K (an integer of N or less) or more times when making the diagnosis N times.

The generator includes a first storage, a second storage, a diagnostic logic bias calculator, and an operational parameter determiner.

The first storage stores diagnosis result data showing whether each of the diagnosis targets is abnormal or normal with respect to each of a plurality of first times.

The second storage stores inspection result data showing whether each of the diagnosis targets is abnormal or normal, the inspection result data being obtained by performing maintenance inspection on the diagnosis targets with respect to at least one second time.

The diagnostic logic bias calculator generates false detection reliability feedback data showing a probability that each diagnosis result of the diagnosis result data is abnormal due to false detection, and overlooking reliability feedback data showing a probability that each diagnosis result of the diagnosis result data is abnormal due to overlooking, the false detection reliability feedback data and the overlooking reliability feedback data being generated depending on a time difference between each of the first times of the diagnosis result data and the second time of the inspection result data.

The diagnostic logic bias calculator updates, based on the false detection reliability feedback data, hyperparameters of a statistical model which includes, as the hyperparameters, a common diagnosis performance $\beta_{fp}$ concerning false detection, and a standard deviation $\sigma_{fp}$ of an individual diagnosis performance $\gamma_{fp}$ concerning false detection, and calculating, from the updated hyperparameters, an average false detection rate $P_{FP}$ showing an average probability of false detection, and a bias level of false detection $M_{FP}$. A false detection rate may be referred to as a false positive rate.

The diagnostic logic bias calculator updates, based on the overlooking reliability feedback data, hyperparameters of a statistical model which includes, as the hyperparameters, a common diagnosis performance $\beta_{fn}$ concerning overlooking, and a standard deviation $\sigma_{fn}$ of an individual diagnosis performance $\gamma_{fn}$ concerning overlooking, and calculating, from the updated hyperparameters, an average overlooking rate $P_{FN}$ showing an average probability of overlooking, and a bias level of overlooking $M_{FN}$. An overlooking rate may also be referred to as a false negative rate.

The operational parameter determiner calculates an expected average false detection rate of the abnormality diagnostic logic from a heterogeneity statistical model defined by the average false detection rate, the bias level of false detection, and the values of N and K, and calculating an expected average overlooking rate of the abnormality diagnostic logic from a heterogeneity statistical model defined by the average overlooking rate, the bias level of overlooking, and the values of N and K, each calculation being performed with respect to each combination of the values of N and K.

The operational parameter determiner calculates an optimization metric from the expected average false detection rate and the expected average overlooking rate; and The operational parameter determiner selects a pair of N and K so that the optimization metric becomes a predetermined one of minimum or maximum.

According to another aspect of the embodiments, there is provided an abnormality diagnosis filter generator determining values of N and K for an abnormality diagnostic logic which makes a diagnosis N (an integer of 2 or greater) times with respect to each diagnosis target by using observation values collected from the diagnosis targets, and generates a diagnosis result showing that the diagnosis target is abnormal if the diagnosis target is judged to be abnormal K (an integer of N or less) or more times when making the diagnosis N times.

The generator includes a first storage, a second storage, a feedback data generator, a diagnosis performance calculator, a sample data generator, a bias calculator, a rate calculator, a metric calculator, and an operational parameter optimization unit.

The first storage stores diagnosis result data showing whether each of the diagnosis targets is abnormal or normal with respect to each of a plurality of first times.

The second storage stores inspection result data showing whether each of the diagnosis targets is abnormal or normal, the inspection result data being obtained by performing maintenance inspection on the diagnosis targets with respect to at least one second time.

The feedback data generator generates false detection reliability feedback data showing a probability that each diagnosis result of the diagnosis result data is abnormal due to false detection, and overlooking reliability feedback data showing a probability that each diagnosis result of the diagnosis result data is abnormal due to overlooking, the false detection reliability feedback data and the overlooking reliability feedback data being generated depending on a time difference between each of the first times of the diagnosis result data and the second time of the inspection result data, based on the diagnosis result data and the inspection result data.

The diagnosis performance calculator obtains $\beta_{fp}$, $\sigma_{fp}$, and an expected value $E(\gamma_{fp})$ of the $\gamma_{fp}$ by solving a statistical model based on maximum likelihood estimation or Markov chain Monte Carlo methods using the false detection reliability feedback data, the statistical model defining posterior distribution of the $\beta_{fp}$, the $\gamma_{fp}$, and the $\sigma_{fp}$ which are hyperparameters, the $\beta_{fp}$ being a common diagnosis performance concerning false detection, and the $\sigma_{fp}$ being a standard deviation of an individual diagnosis performance $\gamma_{fp}$ concerning false detection.

The diagnosis performance calculator obtains $\beta_{fn}$, $\sigma_{fn}$, and an expected value $E(\gamma_{fn})$ of the $\sigma_{fn}$ by solving a statistical model based on the maximum likelihood estimation or the Markov chain Monte Carlo methods using the overlooking reliability feedback data, the statistical model defining posterior distribution of the $\beta_{fn}$, the $\gamma_{fn}$, and the $\sigma_{fn}$ which are hyperparameters, the $\beta_{fn}$ being a common diagnosis performance concerning overlooking, and the $\sigma_{fn}$ being a standard deviation of an individual diagnosis performance $\gamma_{fn}$ concerning overlooking.

The sample data generator generates false detection sample data concerning the false detection based on the $\beta_{fp}$, the $\sigma_{fp}$, and the $E(\gamma_{fp})$, the false detection sample data showing a frequency of false diagnosis when the diagnosis target is diagnosed N times, and to generate, overlooking sample data concerning the overlooking based on the $\beta_{fn}$, the $\sigma$fn, and the $E(\gamma_{fn})$, the overlooking sample data showing a frequency of false diagnosis when the diagnosis target is diagnosed N times;

The bias calculator calculates a average false detection rate $P_{FP}$ showing an average probability of false detection, an average overlooking rate $P_{FN}$ showing an average probability of overlooking, bias level of the false detection $M_{FP}$, and bias level of the overlooking $M_{FN}$, the calculation being performed based on the false detection sample data and the overlooking sample data.

The rate calculator calculates an expected average false detection rate of the abnormality diagnostic logic from a heterogeneity statistical model defined by the average false detection rate, the bias level of false detection, and the values of N and K, and calculates an expected average overlooking rate of the abnormality diagnostic logic from a heterogeneity statistical model defined by the average overlooking rate, the bias level of overlooking, and the values of N and K, each calculation being performed with respect to each combination of the values of N and K.

The metric calculator calculates an optimization metric from the expected average false detection rate and the expected average overlooking rate.

The operational parameter optimization unit selects the pair of N and K so that the optimization metric becomes a predetermined one of minimum or maximum.

Hereinafter, embodiments will be explained in detail referring to the drawings.

The embodiment of the present invention relates to an abnormality diagnosis filter generator having the following functions:

calculating operational parameters (N and K) for minimizing the cost caused by warning errors in a remote abnormality detection system, based on previous remote diagnosis results and inspection history made by maintenance staffs;

minimizing the cost caused by warning errors in a remote abnormality detection system of a multi-input multi-output type, by using two operational parameters (N and K) for issuing a warning to an observer if a diagnosis target is diagnosed as abnormal K or more (less) times when making diagnosis N times;

calculating operational parameters for minimizing the cost caused by warning errors, depending on the levels of two biases in false detection and overlooking included in diagnosis results; and estimating the levels of two biases in false detection and overlooking included in diagnosis results, based on previous remote diagnosis results and inspection history made by maintenance staffs.

Hereinafter, an embodiment of the present invention will be explained referring to the drawings.

FIG. 1 is a block diagram of an abnormality diagnosis system including an abnormality diagnosis filter generator according to the embodiment of the present invention.

In FIG. 1, an abnormality diagnosis filter generator (CPU) 104 calculates and updates operational parameters for minimizing the cost caused by both of "false detection" and "overlooking," the parameters being used by an abnormality diagnostic logic 6 for issuing a warning to an observer when judging an abnormality, which is an event exceeding a warning threshold value (which is set automatically or manually.) The abnormality diagnosis filter generator 104 further calculates a pair of optimum operational parameters (N and K) for a multivariate input to issue a warning an observer if a diagnosis target 101 is diagnosed as abnormal K or more (less) times when making diagnosis N times. Hereinafter, the device of FIG. 1 will be explained in detail.

The diagnosis target 101 is a sensor or an actuator in a building air-conditioning system, for example. FIG. 1 shows only one diagnosis target, but actually a plurality of diagnosis targets are arranged.

A remote diagnostic system 103 includes the abnormality diagnostic logic 6 which diagnoses an abnormality in the sensor using binary data, based on the sensor data (temperature, air volume) and control instruction values (ratio of valve opening etc.) of the building air-conditioning system collected every 10 minutes. The abnormality diagnostic logic 6 makes diagnosis a plurality of times, and gives a final judgment about normal or abnormality depending on the result. When there is an abnormality, an abnormality notifier 8 notifies an observer 104 of the abnormality.

Note that the abnormality diagnostic logic 6 may output the abnormality level by a score-like value so that an abnormality signal is outputted when the value exceeds a threshold value ($\delta$). In this case, the threshold value $\delta$ may be given by a logic designer or an observer by trial and error or may be set automatically.

An operational parameter storage 102 of the remote diagnostic system 103 stores operational parameters of the abnormality diagnostic logic 6. For example, the operational parameters includes: operation interval (T) of the abnormality diagnostic logic; data length (DL) used for diagnosis; and diagnosis frequency (N) and judgment frequency (K) showing that the diagnosis target 101 is diagnosed as abnormal K or more (less) times when obtaining diagnosis result N times, which are used as judgment standards when notifying an abnormality.

In the embodiment of the present invention, the abnormality diagnosis filter generator 104 optimizes the operational parameters (N, K) to satisfy both of maintenance cost and reliability. In the operational parameters, the operation interval (T) of the abnormality diagnostic logic and the data length (DL) used for diagnosis may be variably changed to "use the data on an arbitrary day" or to "use the data in this time period," for example.

The diagnosis target 101 is formed of m diagnosis targets. Observation values of m diagnosis targets are stored as process data having at least a length equal to or greater than the data length (DL) (having time points equal to or greater than DL) in the diagnosis target 101 itself or an external storage device through a network. The process data has a format in which all of the sensor measured values and control instruction values are related to one time point, for example. The process data is acquired at predetermined time intervals, for example at intervals of 1 hour, 10 minutes, or 1 minute.

The abnormality diagnostic logic 6 diagnoses each process data (sensor measured value and control instruction value) acquired from the diagnosis target 101, in accordance with the operation interval (T) and the data length (DL) used for diagnosis stored in the operational parameter storage 102. The abnormality diagnostic logic 6 calculates the abnormality level of each diagnosis target in the process data, and gives a final judgment about normal/abnormality to each diagnosis target. The diagnosis result is added with time information to generate time-related diagnosis result data, and the generated data is stored in a time-related diagnosis result storage 7.

The abnormality notifier 8 notifies the observer 104 of the diagnosis target judged by the abnormality diagnostic logic 6 as having an abnormality.

On the other hand, a time-related inspection data storage 9 is a database storing: inspection results of diagnosis targets recorded by maintenance staffs with time information; and judgment information about normal/abnormality. The inspection data is inputted by a maintenance staff when he/she performs maintenance work on the sensors of the building air-conditioning system, for example.

The time-related inspection result data is a combination of time information and judgment information about normal/abnormality. The judgment information is data having a value of 0 in the case of normal, and having a value of 1 in the case of abnormality. The time-related inspection result data serves as an instruction signal for the time-related diagnosis result data stored in the time-related diagnosis result storage 7.

A diagnostic logic bias calculator 1 compares the time-related diagnosis result data with the time-related inspection result data to calculate the performance and bias level of the abnormality diagnostic logic 6. The diagnostic logic bias calculator 1 includes: a first storage for at least temporarily storing the time-related diagnosis result data; and a second storage for at least temporarily storing the time-related inspection result data.

The diagnostic logic bias calculator 1 calculates "the average false detection rate and average overlooking rate in the abnormality diagnosis result" as the above performance, and calculates "the bias in the frequency of false detection and overlooking depending on the diagnosis target" as the above bias level.

"False detection" means judging that the system is abnormal when the system is actually normal, and "overlooking" means judging that the system is normal when the system is actually abnormal.

The process performed by the diagnostic logic bias calculator 1 will be explained in detail later.

An operational parameter determiner 2 evaluates a model (explained later) in each state expressed by the diagnosis frequency N and the judgment frequency K while changing the pair of values N and K, obtains expected values for diagnosis performance concerning false detection and overlooking, and obtains an optimization metric by substituting each expected value for a calculation formula (function) inputted from an optimization metric function input unit 4.

For example, maintenance cost (first metric) is obtained from false detection of the diagnosis performance by using a maintenance cost function, and damage cost (second metric) caused by overlooking abnormality is obtained from overlooking of the diagnosis performance by using a damage cost function. The total of the maintenance cost and the damage cost is calculated as the above optimization metric. The maintenance cost is caused when a maintenance staff inspects the diagnosis target, and the maintenance cost increases as the frequency of false detection increases, which increases the frequency of unnecessarily calling out the maintenance staff. The damage cost is caused when the maintenance staff is not called out for inspection when the diagnosis target is abnormal, and the damage cost increases as the frequency of abnormality overlooking increases, which increases complaints about the abnormality of the diagnosis target.

When determining the operational parameters, a coverage evaluator 5 samples the diagnosis frequency N and the judgment frequency K and evaluates coverage in order to avoid local solution. The coverage evaluator 5 changes the values of N and K and gives the values to the operational parameters.

The operational parameter determiner 2 determines optimum operational parameters (optimum diagnosis frequency N* and optimum judgment frequency K*) for minimize (or maximize) the value obtained by performing weighted sum on the maintenance cost and the damage cost.

The process performed by the operational parameter determiner 2 will be explained in detail later.

A diagnostic logic operating unit 3 reflects the optimum operational parameters (the optimum diagnosis frequency N* and the optimum judgment frequency K*) obtained by the operational parameter determiner 2 in the operational parameter storage 102 as the diagnosis frequency N and the judgment frequency K. That is, N and K stored in the operational parameter storage are updated by N* and K*.

Figure 2:
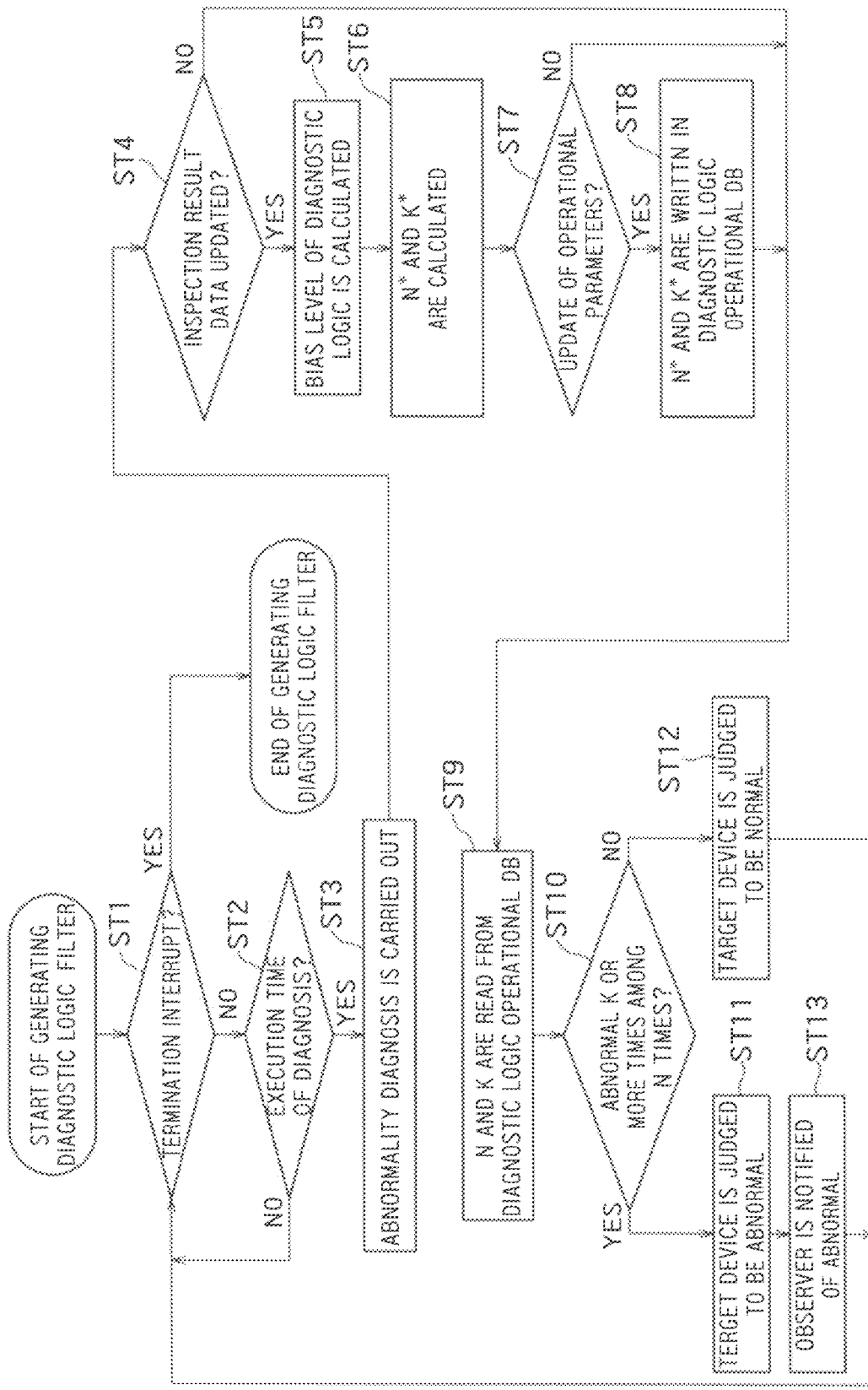
FIG. 2 is a flow chart schematically showing the operating sequence of the device of FIG. 1.

Hereinafter, an example of the operating sequence will be explained using FIG. 2.

First, when diagnosis time comes (ST2), the abnormality diagnostic logic 6 carries out abnormality diagnosis (ST3). Here, time-related diagnosis result data is generated for the sensors forming the diagnosis target. FIG. 3 shows an example of the time-related diagnosis result data. The time-related diagnosis result data is matrix data in which 0 is recorded when the diagnosis result is normal and 1 is recorded when the diagnosis result is abnormal with respect to each diagnosis target and time (first time), for example.

Next, the time-related inspection result data is acquired from the time-related inspection data storage 9 to judge whether the time-related inspection result data is updated compared to the previous one (ST4). For example, the judgement is made based on whether the final time is different from the previous inspection result data. Each of FIG. 4(A) and FIG. 4(B) shows an example of the time-related inspection result data.

In FIG. 4(A), inspection result data of every diagnosis target is recorded with respect to each time (second time) (complete data). When the number of diagnosis targets (target devices) is extremely large, it is impossible to inspect all diagnosis targets at the same time. Thus, it is rare that inspection result data of every target device is recorded with respect to each diagnosis. Generally, as shown in FIG. 4(B), inspection is performed on a subset of diagnosis targets with a frequency lower than the total diagnosis frequency (incomplete data).

When it is judged that the time-related inspection result data is updated compared to the previous one, the diagnostic logic bias calculator 1 estimates average false detection rate, bias level of false detection, average overlooking rate, and bias level of overlooking from the time-related diagnosis result data and the time-related inspection result data (ST5).

After that, the operational parameter determiner 2 obtains the optimum diagnosis frequency N* and the optimum judgment frequency K* considering the balance between maintenance cost and loss cost (ST6). If the optimum diagnosis frequency N* and the optimum judgment frequency K* are different from the diagnosis frequency N and the judgment frequency K currently stored in the operational parameter storage 102 (YES at ST7), the optimum diagnosis frequency N* and the optimum judgment frequency K* are as written in the operational parameter storage 102 as new diagnosis frequency N and judgment frequency K (ST8).

In the last, the diagnosis frequency N and the judgment frequency K are read from the operational parameter storage 102 (ST9), and the abnormality diagnostic logic 6 judges that an arbitrary sensor is abnormal if the sensor is diagnosed as abnormal K or more times when making diagnosis N times, and the abnormality notifier 8 notifies the observer 104 of the sensor (YES at ST10, ST11, and ST13). If not in the case, the abnormality diagnostic logic 6 judges the sensor as normal (NO at ST10 and ST 12).

It is supposed that the abnormality diagnostic logic 6 carries out diagnosis in ST9 to ST13 by using the process data acquired after the diagnosis date and time recorded in the last of the database of FIG. 4(A) or FIG. 4(B), for example.

<Diagnostic Logic Bias Calculator>

The present embodiment is effective in reducing the frequency of false detection and overlooking, by notifying abnormality if the diagnosis target is diagnosed as abnormal K or more (less) times when making diagnosis N times, instead of notifying abnormality when the diagnosis target is diagnosed as abnormal based on one diagnosis result.

If all diagnosis targets (sensors and actuators for example) are uniform in the generation probability of false detection and overlooking, the diagnosis frequency N and the judgment frequency K serving as operational parameters are consistent with a binomial distribution model, and thus can be estimated based on formulation. However, when the generation probability of false detection and overlooking is different depending on the diagnosis target, the parameters are not consistent with the binomial distribution model, and thus cannot be estimated based on formulation. A heterogeneity statistical model is introduced so that the probability distribution for N and K can be estimated based on formulation even when the generation probability of false detection and overlooking is different depending on the diagnosis target.

Beta binomial distribution is known as one type of the heterogeneity statistical model. The beta binomial distribution is a statistical model employed when estimating the achievement rate of an advertisement medium in the field of mass media. When estimating the achievement rate of an advertisement medium based on the beta binomial distribution, average viewer rate and average overlapping viewer rate are used as parameters. In this example, these parameters correspond to the average false detection rate (average overlooking rate) and the bias level (or average overlapping level) of false detection (overlooking). When estimating the achievement rate of an advertisement medium, complete feedback data can be obtained as input data by carrying out a questionnaire. On the other hand, when performing inspection in this example, incomplete data as shown in FIG. 4(B) is generally obtained. Note that the overlapping level represents how many overlaps are included in the state at time i and the state at time j following the time i (defined as $P_{ij}$). The average overlapping level represents the average overlapping level with respect to all time combinations.

$$(2/n(n-1))\Sigma_{i<j}(P_{ij})$$

Accordingly, probability-related feedback data (diagnostic reliability feedback data) is generated from the incomplete data as shown in FIG. 4(B) in terms of each of false detection and overlooking, the probability-related feedback data expressing the reliability (probability) concerning the false detection and overlooking of each diagnosis target in the time-related diagnosis result data. Further, obtained from the diagnostic reliability feedback data are average false detection rate ($P_{FP}$), average overlooking rate ($P_{FN}$), bias level of false detection ($M_{FP}$), and bias level of overlooking ($M_{FN}$) (bias level is in proportion to the average overlapping level of false detection (overlooking).)

The average false detection rate ($P_{FP}$), the average overlooking rate ($P_{FN}$), the bias level of false detection ($M_{FP}$), and the bias level of overlooking ($M_{FN}$) are obtained from the probability-related feedback data by using a statistical model (hyperparameter-related statistical model) having common diagnosis performance of the abnormality diagnostic logic and dispersion of individual diagnosis performance as hyperparameters.

The hyperparameters are updated to derive an approximation model suitable for the present state, and to calculate the average false detection rate ($P_{FP}$), the bias level of false detection ($M_{FP}$), the average overlooking rate ($P_{FN}$), and the bias level of overlooking ($M_{FN}$).

$$p(\beta, \{\gamma_i\}, \sigma | \{y_i\}) \propto \pi_{i=1 \ldots L} f(y_i | q_i)$$
$$g_\beta(\beta) g_\gamma(\gamma_i | \sigma) h(\sigma) \quad \text{Mathematical formula 1}$$

Mathematical formula 1 shows a hyperparameter-related statistical model. $g_\beta(\beta)$ represents prior distribution of common capability, $g_\gamma(\gamma_i | \sigma)$ represents prior distribution of individual diagnosis capability $\gamma_i$, $h(\sigma)$ represents distribution concerning the individual diagnosis capability $\gamma_i$, and standard deviation $\sigma$ of the distribution is the hyperparameter.

$\{y_i\}$ expresses observed data, which is the diagnostic reliability feedback data in the present invention.

$$q_i = 1/(1 + \exp(-(\beta + \gamma_1))) \quad \text{Mathematical formula 2}$$

$q_i$ represents diagnosis capability for each diagnosis target, and serves as a statistical model (logit model) shown in mathematical formula 2. $\beta$ is a population parameter (expressing the characteristics of a population by one value) common to all individuals, and $\gamma_i$ is a population parameter characteristic of each individual. In this example, $\beta$ can be interpreted as a population parameter representing the common capability of the abnormality diagnosis device, and $\gamma_i$ can be interpreted as the individual diagnosis capability for each diagnosis target. The value of the diagnosis capability $q_i$ becomes larger as $\gamma_i$ becomes larger.

$$g_\gamma(\gamma_i | \sigma) = (1/\sqrt{2\sigma^2 \pi}) \exp(-(\gamma_i^2/2\sigma^2)) \quad \text{Mathematical formula 3}$$

$g_\gamma(\gamma_i | \sigma)$ represents prior distribution of individual diagnosis capability. Distribution of the individual diagnosis capability for each diagnosis target is considered is to be consistent with a certain type of distribution. This can be assumed to be normal distribution with average zero and standard deviation $\sigma$, and thus can be expressed as in mathematical formula 3.

$$h(\sigma) = (\sigma^{10-1} \exp(-\sigma/10))/(10^{10} \lceil (10)) \quad \text{Mathematical formula 4}$$

The standard deviation $\sigma$ of individual diagnosis capability is a hyperparameter of the distribution concerning individual diagnosis capability. The standard deviation $\sigma$ is greater than 0, for example, and thus smooth gamma distribution ($\lceil$) as in mathematical formula 4 or uniform distribution can be expected.

$$g_\beta(\beta) = (1/\sqrt{2 \times 10^2 \pi}) \exp(-(\beta^2/(2 \times 10^2))) \quad \text{Mathematical formula 5}$$

The prior distribution $g_\beta(\beta)$ concerning common capability has no prior information, and thus defined as noninformative prior distribution. For example, normal distribution with average zero and standard deviation 10 as in mathematical formula 5 can be expected (smooth normal distribution).

<Diagnostic Logic Bias Calculator—Generating Time-Related Diagnostic Reliability Feedback Data—>

Figure 9:
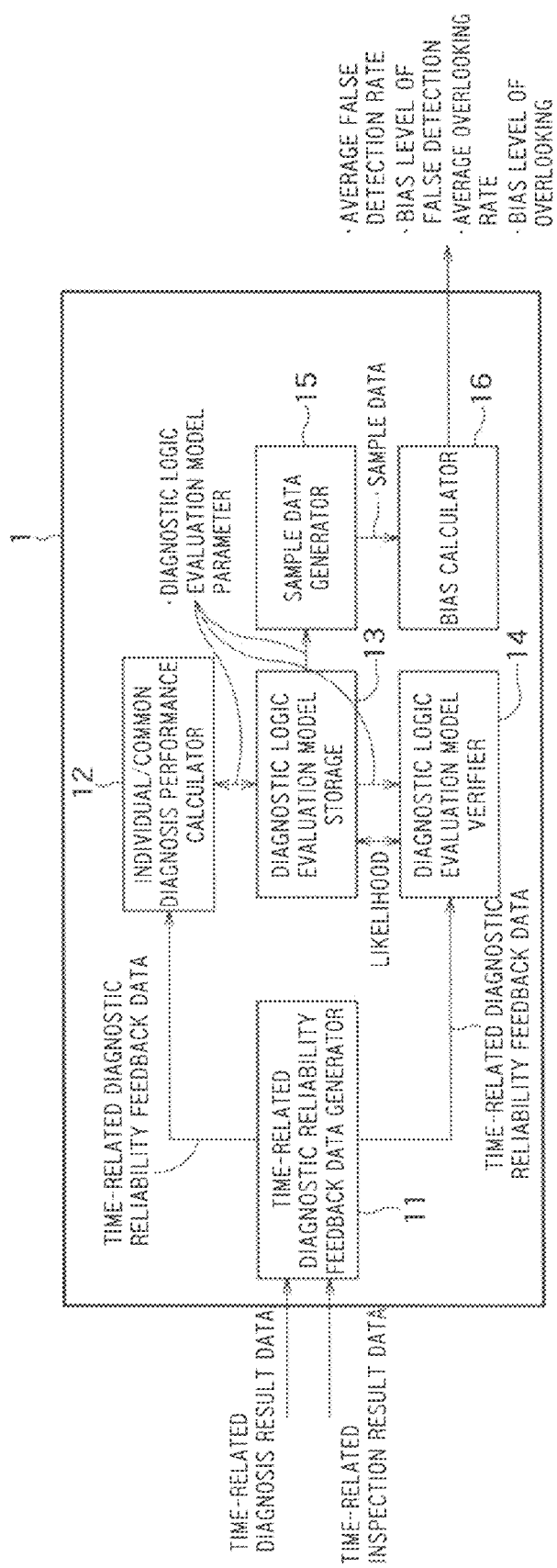
FIG. 9 is a block diagram showing the structure of a diagnostic logic bias calculator.

FIG. 9 is a block diagram showing the structure of the diagnostic logic bias calculator 1.

A time-related diagnostic reliability feedback data generator 11 receives time-related diagnosis result data (X) and time-related inspection result data (Y), and generates time-related diagnostic reliability feedback data $Z_{FP}$ and $Z_{FN}$ by allocating the instruction signal showing whether false detection and overlooking occur to the diagnosis result of the time-related diagnosis result data (X).

In the case of complete data as shown in FIG. 4(A), the time-related diagnostic reliability feedback data generator 11 receives matrixes of the time-related diagnosis result data and time-related inspection result data corresponding to time information, and obtains the time-related diagnostic reliability feedback data based on $Z_{FP} = X - Y$, and $Z_{FN} = X - Y$. Note that $Z_{FP} \geq 0$ and $Z_{FN} \leq 0$.

Here, the time-related diagnostic reliability feedback data $Z_{FP}(Z_{FN})$ becomes "1" when false detection (or overlooking) occurs, and becomes "0" in the other cases.

FIG. 5A shows an example of the time-related diagnostic reliability feedback data $Z_{FP}$ concerning false detection. FIG. 5B shows an example of the time-related diagnostic reliability feedback data $Z_{FN}$ concerning overlooking.

On the other hand, in the case of incomplete data as shown in FIG. 4(B), the time-related diagnostic reliability feedback data generator 11 generates the time-related diagnostic reliability feedback data by using reliability (probability) based on the time difference between inspection time and diagnosis time.

For example, the time-related diagnostic reliability feedback data $Z_{FP}$ concerning false detection shown in FIG. 8A and the time-related diagnostic reliability feedback data $Z_{FN}$ concerning overlooking shown in FIG. 8B are generated from the time-related diagnosis result data of FIG. 3 and the time-related inspection result data of FIG. 4(B).

Hereinafter, detailed explanation will be made on how to generate the time-related diagnostic reliability feedback data in the case of incomplete data as in FIG. 4(B).

Figure 6:
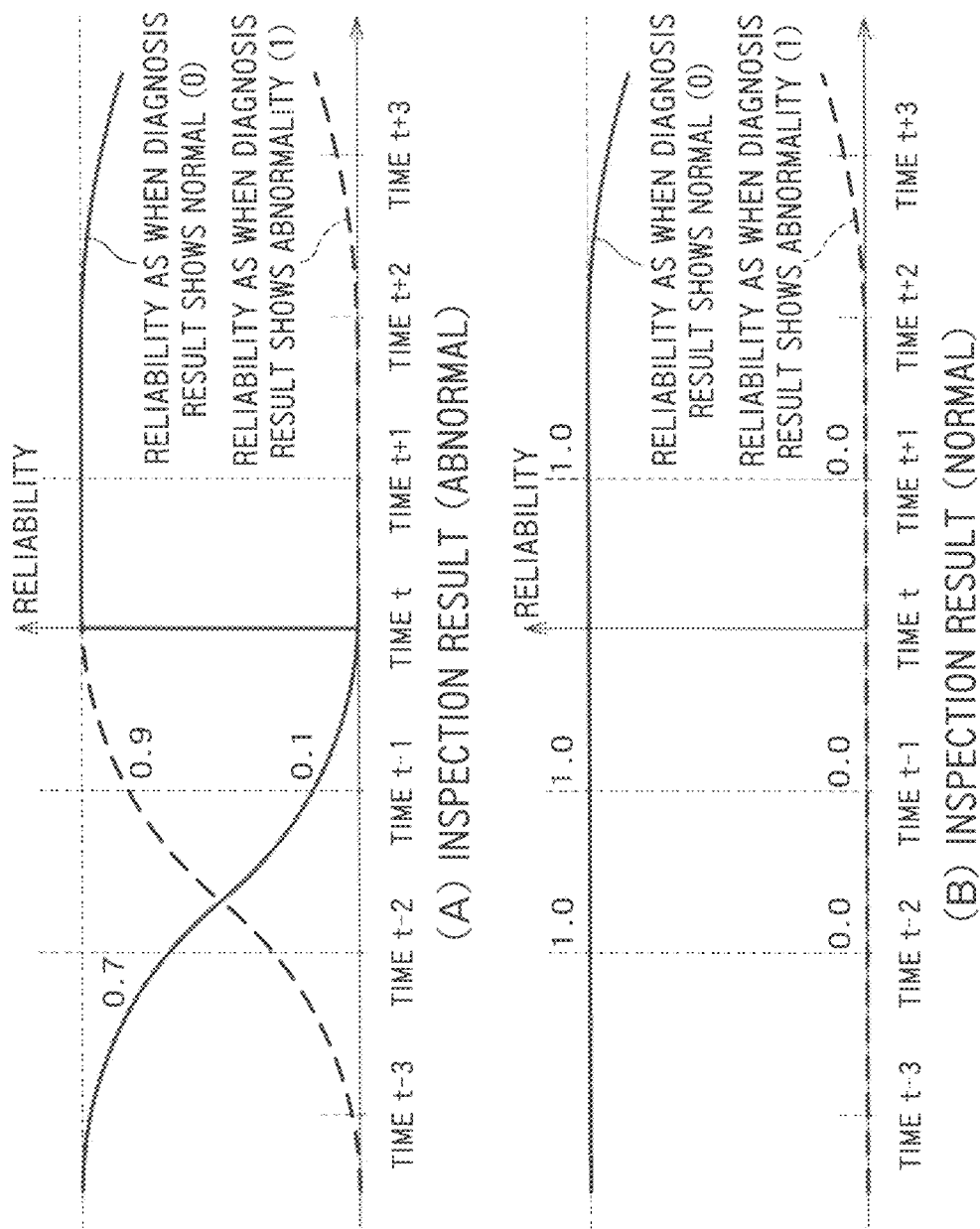
FIG. 6 is a diagram showing reliability defined based on the difference between inspection time and diagnosis time.

The reliability based on the difference between inspection time and diagnosis time may be previously defined as shown in FIG. 6, or may be dynamically generated by performing lifetime analysis, for example. Here, the example of FIG. 6, in which the reliability is previously defined, will be discussed.

[When the Inspection Result is Normal (0) at Time T]

It is unlikely that the abnormal diagnosis target is naturally restored, and thus the reliability of having normal diagnosis result before time t is 1.0. To the contrary, the reliability of having abnormal diagnosis result before time t is 0.0.

The reliability of having normal diagnosis result after time t is 1.0. However, the sensor becomes more likely to be abnormal as time passes, and thus the reliability of having normal diagnosis result is gradually reduced. On the other hand, the reliability of having abnormal diagnosis result is 0.0, and the reliability of having abnormal diagnosis result is gradually increased as time passes.

[When Inspection Result is Abnormal (1) at Time T]

When the inspection result is abnormal at time t, the sensor is adjusted in the inspection work, and thus the operation to be performed after time t is similar to that when the inspection result is normal at time t.

The reliability of having abnormal diagnosis result at time t, when the inspection result is abnormal, is 1.0. However, the reliability is reduced as time gets earlier than time t since the sensor is less likely to be abnormal. To the contrary, the reliability of having normal diagnosis result is 0.0 at time t, but the reliability is increased as time gets earlier than time t.

Figure 7:
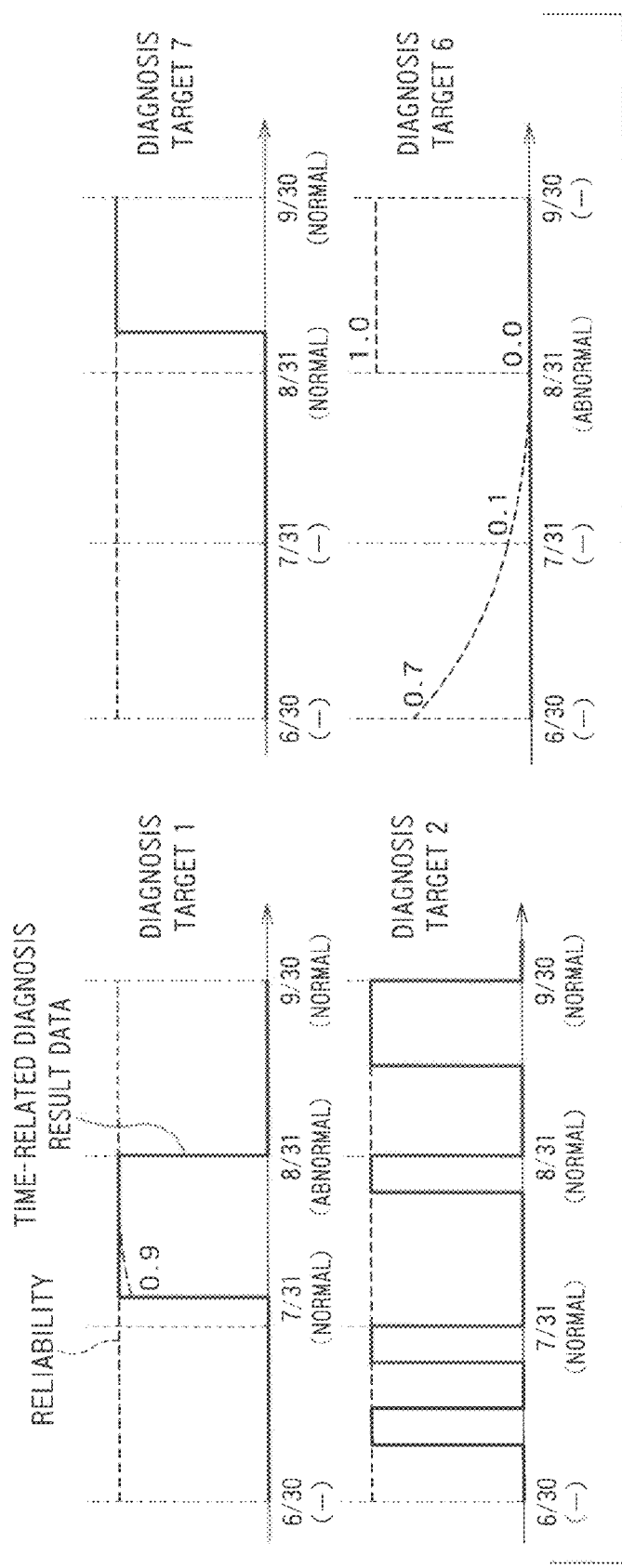
FIG. 7 is a diagram to explain reliability obtained for the time-related diagnosis result data.

FIG. 7 shows the reliability of the time-related diagnosis result data when applying the reliability established based on this definition to the time-related diagnosis result data of FIG. 3 and the time-related inspection result data of FIG. 4(B). In this case, when there is reliability overlapping at a certain time, the reliability at the time is obtained by employing the average reliability at the time, the reliability at the time closer to the present time from the inspection result time, or the reliability obtained by the inspection result after the present time.

By performing this process in terms of each of false detection and overlooking, the time-related diagnostic reliability feedback data $Z_{FP}$ concerning false detection as shown in FIG. 8A and the time-related diagnostic reliability feedback data $Z_{FN}$ as shown in FIG. 8B can be obtained.

<Diagnostic Logic Bias Calculator—Deriving Common Diagnosis Performance and Individual Diagnosis Performance—>

An individual/common diagnosis performance calculator (diagnosis performance calculator) 12 receives the time-related diagnostic reliability feedback data $Z_{FP}$ and $Z_{FN}$, and obtains: posterior distribution of the common diagnosis performance β satisfying mathematical formula 1 concerning posterior distribution; posterior distribution of the standard deviation σ concerning individual diagnosis performance; and posterior distribution of $\{\gamma_i\}$, by using well-known techniques such as maximum likelihood estimation method and Markov chain Monte Carlo methods (Gibbs method, Metropolis method, and Metropolis-Hastings method).

Figure 12:
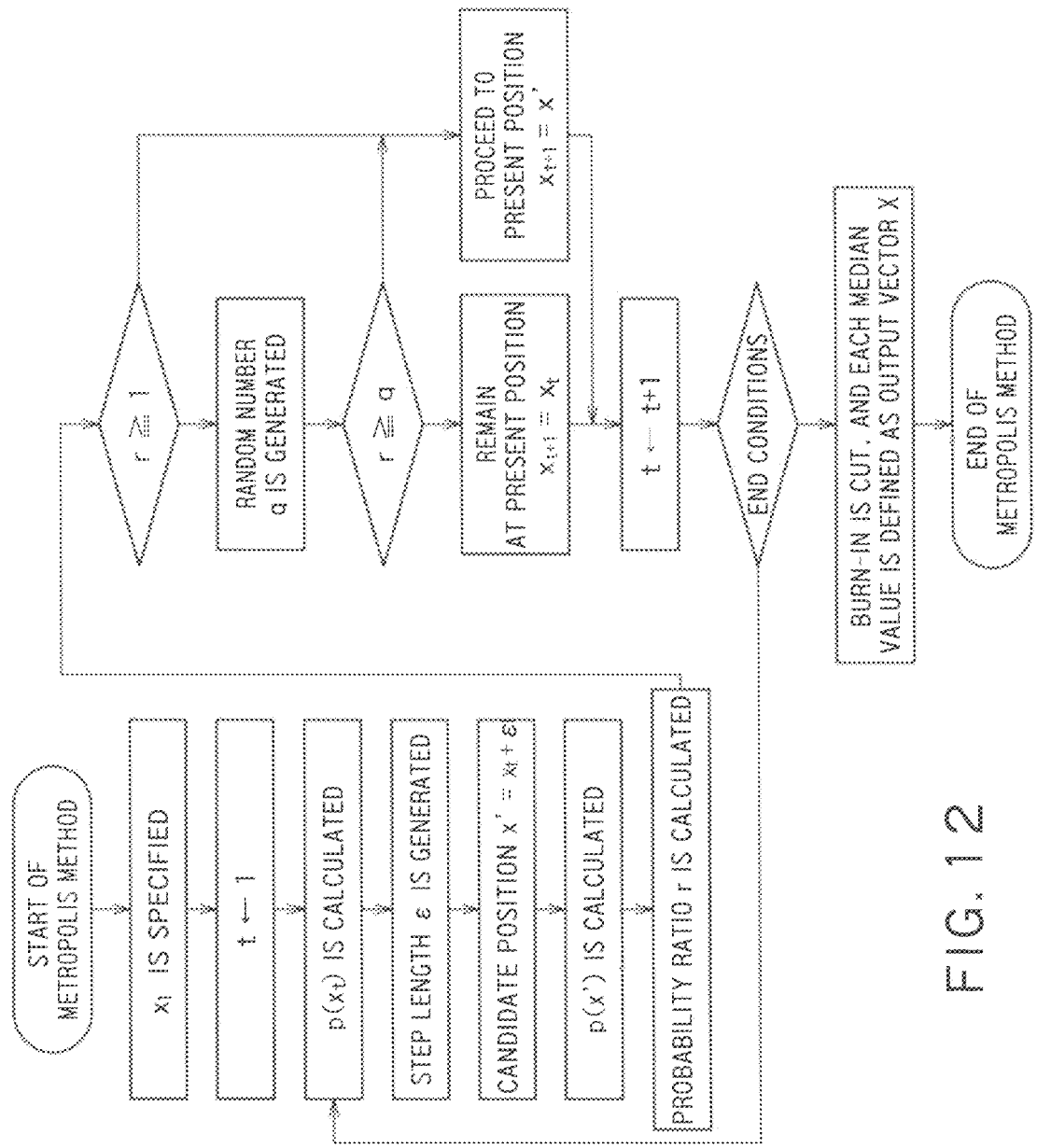
FIG. 12 is a flow chart based on the Metropolis method.

In the Markov chain Monte Carlo methods, coordinates having density in proportion to the value of a distribution function are sampled to simulate the distribution function by the coordinates. FIG. 12 shows a flow chart of the Metropolis method. x1 represents initial values $\{\beta_1, \sigma_1, \{\gamma_{i1}\}\}$ (each is an arbitrary value) of diagnostic logic evaluation model parameters. As a result, diagnostic logic evaluation model parameters $\{\beta^*, \sigma^*, \{\gamma_i^*\}\}$ suitable for the time-related diagnostic reliability feedback data are obtained. The common diagnosis performance and individual diagnosis performance are derived in terms of each of false detection and overlooking. The following items are stored in a diagnostic logic evaluation model storage (model storage) 13 as the diagnostic logic evaluation model parameters:

m: the number of diagnosis targets (column size of the time-related diagnostic reliability feedback data);

n: the number of samples (row size of the time-related diagnostic reliability feedback data);

$\beta_{fp}$: common diagnosis performance concerning false detection (β* concerning false detection);

$\beta_{fn}$: common diagnosis performance concerning overlooking (β* concerning overlooking);

$\sigma_{fp}$: standard deviation of individual diagnosis performance concerning false detection (σ* concerning false detection);

$\sigma_{fn}$: standard deviation of individual diagnosis performance concerning overlooking (σ* concerning overlooking);

$E(\gamma_{fp})$: expected value of individual diagnosis performance concerning false detection ($\{\gamma_i^*\}$ i=1 . . . m concerning false detection); and $E(\gamma_{fn})$: expected value of individual diagnosis performance concerning overlooking ($\{\gamma_i^*\}$ i=1 . . . m concerning overlooking).

Further, a likelihood table is cleared and the following items are stored in the diagnostic logic evaluation model storage 13 (the method for calculating likelihood will be mentioned later):

Time: model generation time (1st row)

Lfp: likelihood of time-related diagnostic reliability feedback data when diagnostic logic evaluation model parameters concerning false detection are given; and $L_{fn}$: likelihood of time-related diagnostic reliability feedback data when diagnostic logic evaluation model parameters concerning overlooking are given.

FIG. 10 shows a structural example of the data stored in the diagnostic logic evaluation model storage.

Note that the calculation based on maximum likelihood estimation and a concrete algorithm such as Markov chain Monte Carlo methods are described in the following document: Wakui Yoshiyuki "Dougu to Shiteno Beizu Toukei" Nippon Jitsugyo Publishing Co., Ltd. (2009).

<Diagnostic Logic Bias Calculator—Diagnostic Logic Evaluation Model Verifier—>

A diagnostic logic evaluation model verifier (model verifier) 14 is a component for judging whether it is necessary to update the diagnostic logic model parameters stored in the diagnostic logic evaluation model storage 13.

First, the diagnostic logic evaluation model verifier 14 reads the diagnostic logic model parameters stored in the diagnostic logic evaluation model storage 13 and the time-related diagnostic reliability feedback data $Z_{FP}$ and $Z_{FN}$, and calculates likelihood of achieving the state of the time-related diagnostic reliability feedback data $Z_{FP}$ and $Z_{FN}$ with respect to the diagnostic logic model parameters. The obtained likelihood is added with execution time information, and stored in the diagnostic logic evaluation model storage 13 as likelihood history information. The likelihood history information includes likelihood ($L_{fp}$) concerning false detection and likelihood ($L_{fn}$) concerning overlooking. The likelihood is calculated in accordance with mathematical formula 6.

$$L_{fp} = \pi_{i=1 \ldots m} f(yi(fp)|q_i(fp))$$

$$L_{fn} = \pi_{i=1 \ldots m} f(yi(fn)|q_i(fn))$$ Mathematical formula 6

$q_i$ is defined in mathematical formula 2.

Figure 11:
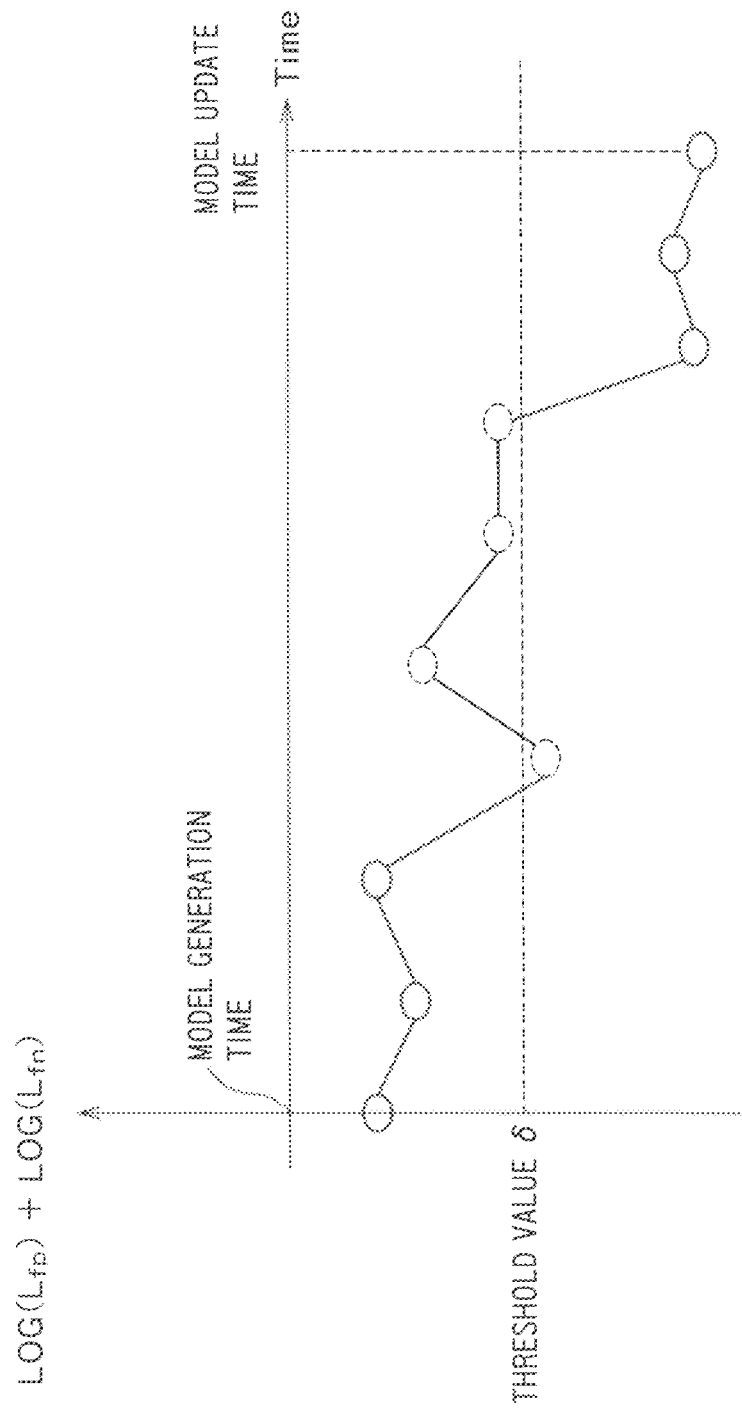
FIG. 11 is a diagram showing an example of updating a diagnostic logic evaluation model.

Whether the diagnostic logic evaluation model should be updated is judged by using trend data of log likelihood LOG ($L_{fp}$)+LOG($L_{fn}$). For example, the diagnostic logic evaluation model is updated when the log likelihood becomes less than the threshold value δ, when the log likelihood becomes less than the threshold value δ s times (the value of s is previously defined) in succession, or when the inclination of trend components of the log likelihood becomes less than the threshold value θ. FIG. 11 shows an example where the diagnostic logic evaluation model is updated when the log likelihood becomes less than the threshold value δ s(=3) times in succession.

<Diagnostic Logic Bias Calculator—Sample Data Generator—>

A sample data generator 15 reads the diagnostic logic evaluation model parameters stored in the diagnostic logic evaluation model storage 13, and generates sample data of n samples in terms of each of false detection and overlooking.

The sample data can be regarded as an expected value of the number of samples n with respect to the posterior distribution given by mathematical formula 1. The simplest calculation method is to substitute $\beta_{fp}$, $E(\gamma_{fp})$, $\beta_{Fn}$, and $E(\gamma_{fn})$ read from the diagnostic logic evaluation model storage 13 for mathematical formula 2.

$$x_{FP}=n/(1+\exp(-(\beta_{fp}+E(\gamma_{fp}))))$$

$$x_{FN}=n/(1+\exp(-(\beta_{Fn}+E(\gamma_{fn}))))$$

The sample data is one-dimensional vector $x_{FP}, (x_{FN})$ showing how many times false diagnosis (or overlooking) occurs when making diagnosis N times in each diagnosis target. The length of the vector is the number of diagnosis targets, and each element has a discrete value of 0 to n. FIG. 13(A) shows a structural example of sample data $x_{FP}$, and FIG. 13(B) shows a structural example of sample data $x_{FN}$.

<Diagnostic Logic Bias Calculator—Bias Calculator—>

A bias calculator 16 receives the sample data, and obtains average false detection rate $p_{FP}$, bias level of false detection $M_{FP}$, average overlooking rate $p_{FN}$, and bias level of overlooking $M_{FN}$.

$$p_{FP}=\Sigma_{k=1\ldots m}x_{FP}(k)/n$$

$$p_{FN}=\Sigma_{k=1\ldots m}x_{FN}(k)/n \qquad \text{Mathematical formula 7}$$

n is the number of samples.

The standard deviations $\sigma_{fp}$ and $\sigma_{fn}$ are given by the following formula using the expected values of $x_{FP}$ and $x_{FN}$ respectively.

$$\sigma_{fp}^2(x_{FP})=1/m\Sigma_{k=1\ldots m}(x_{FP}-\sim x_{FP})^2$$

$$\sigma_{fn}^2(x_{FN})=1/m\Sigma_{k=1\ldots m}(x_{FN}-\sim x_{FN})^2 \qquad \text{Mathematical formula 8}$$

The bias levels $M_{FP}$ and $M_{FN}$ are given by the following formula.

$$(1-M_{FP})=(\sigma s^2(x_{FP})-\sigma f^2(x_{FP}))/(\sigma s^2(x_{FP})-\sigma r^2(x_{FP}))$$

$$(1-M_{FN})=(\sigma s^2(x_{FN})-\sigma f^2(x_{FN})/(\sigma s^2)x^{FN})-\sigma r^2(x_{FN})) \qquad \text{Mathematical formula 9}$$

Here, $\sigma s^2$ is dispersion of x in a complete dispersion state, and is dispersion of x in a complete mixture state.

$$\sigma_s^2=n^2 p'(1-p') \; p' \text{ is } p_{FP} \text{ or } p_{FN}$$

$$\sigma_r^2=np'(1-p') \; p' \text{ is } p_{FP} \text{ or } p_{FN} \qquad \text{Mathematical formula 10}$$

<Explanation on the Operation Performed by Diagnostic Logic Bias Calculator>

Figure 14:
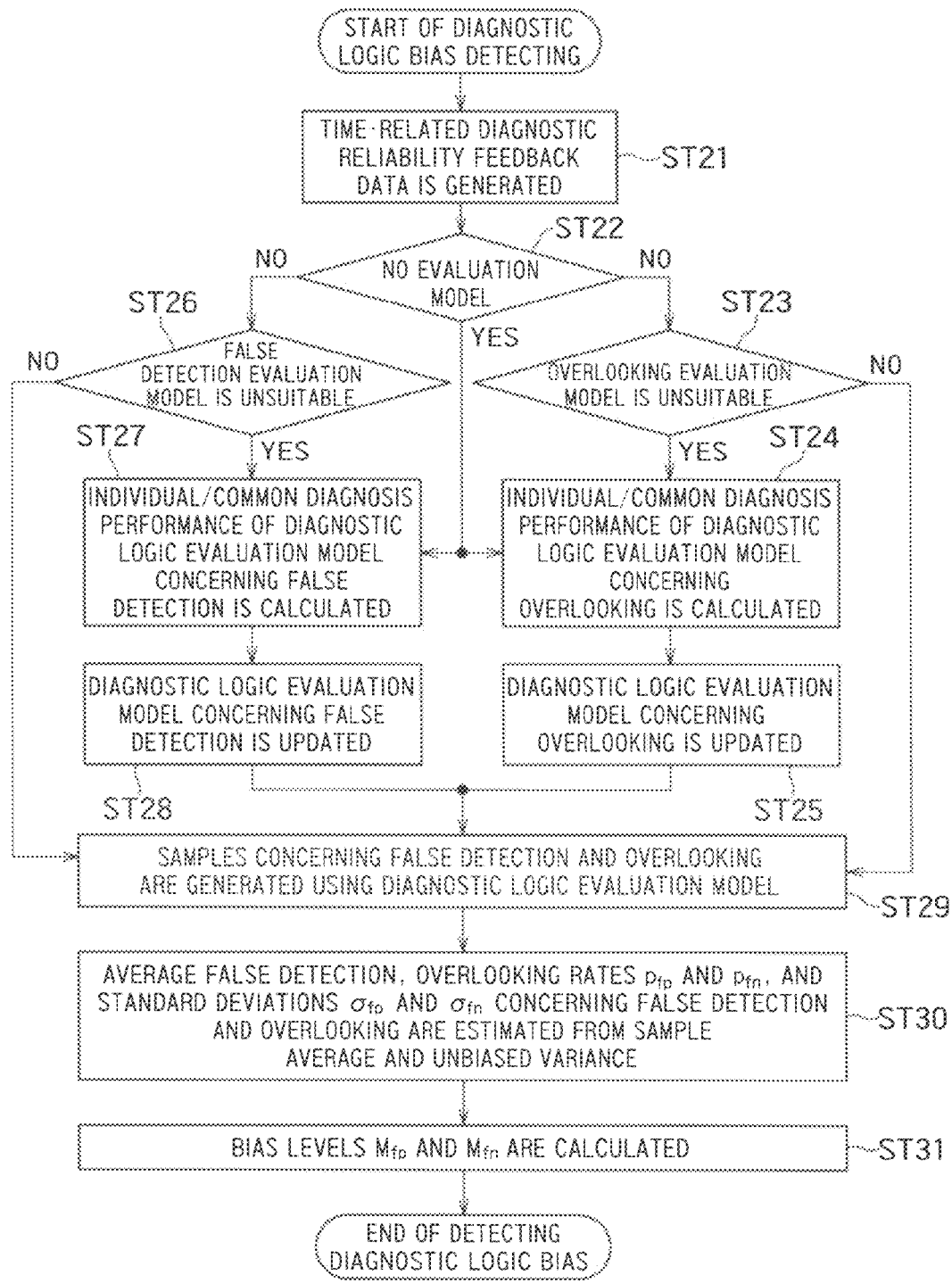
FIG. 14 is a flow chart to explain the operation steps of the diagnostic logic bias calculator.

The operation steps of the diagnostic logic bias calculator 1 will be explained using FIG. 14.

First, the time-related diagnostic reliability feedback data generator 11 generates the time-related diagnostic reliability feedback data $Z_{FP}$ and $Z_{FN}$ based on the above method (ST21). That is, generated are: the time-related diagnostic reliability feedback data $Z_{FP}$ having a size of n×m concerning false detection; and the time-related diagnostic reliability feedback data $Z_{FN}$ having a size of n×m concerning overlooking. The data is stored in a main memory.

Next, whether there is a diagnostic logic evaluation model is judged depending on whether data (1st row of the likelihood table, for example) is stored in the diagnostic logic evaluation model storage 13 (ST22).

If a diagnostic logic evaluation model exists, the diagnostic logic evaluation model verifier 14 judges whether the diagnostic logic evaluation model is valid in terms of each of false diagnosis and overlooking, based on the above method (ST26 and ST23).

When this evaluation result shows that the diagnostic logic evaluation model is unsuitable, the individual/common diagnosis performance calculator 12 calculates diagnostic logic evaluation model parameters (standard deviation and expected value of individual diagnosis performance, common diagnosis performance, etc.) based on the above method, and stores (updates) the parameters in the diagnostic logic evaluation model storage 13 (ST27, ST28, ST24, and ST25).

After that, the sample data generator 15 reads the diagnostic logic evaluation model parameters stored in the diagnostic logic evaluation model storage 13 and generates samples concerning false detection and overlooking, based on the above method (ST29).

The sampled data is a matrix of (1×m) as shown in FIG. 13, and an expected false detection frequency (expected overlooking frequency) with respect to the number of samples n is outputted into each matrix element.

Then, the bias calculator 16 obtains the average false detection rate $p_{FP}$, the average overlooking rate $p_{FN}$, and the standard deviations $\sigma_{fp}$ and $\sigma_{fn}$ first (ST30), and subsequently calculates the bias levels $M_{FP}$ and $M_{FN}$ (ST31), based on the above method.

<Operational Parameter Determiner>

The operational parameter determiner 2 of FIG. 1 derives operational parameters (diagnosis frequency N* and judgment frequency K*, note that "abnormality is judged only when the diagnosis result is abnormal K* or more times when performing diagnostic logic N* times") for minimizing (or maximizing) the optimization metric obtained from maintenance cost, damage cost, etc. In this way, the object of reducing maintenance cost can be achieved even when the diagnostic logic is a low-performance type having difficulty in achieving the object by performing diagnosis one time.

Binomial distribution is known as a statistical model for estimating an expected value of the diagnosis result diagnosed as abnormal K or more times when making diagnosis N times, as stated above.

However, in many cases, the probability of false detection and overlooking by the diagnostic logic is different depending on the diagnosis target. Therefore, the diagnosis frequency N* and the judgment frequency K* for maximizing diagnosis performance are determined by using a heterogeneity statistical model expressed by the average false detection rate (average overlooking rate) and the bias level of false detection (bias level of overlooking).

Figure 15:
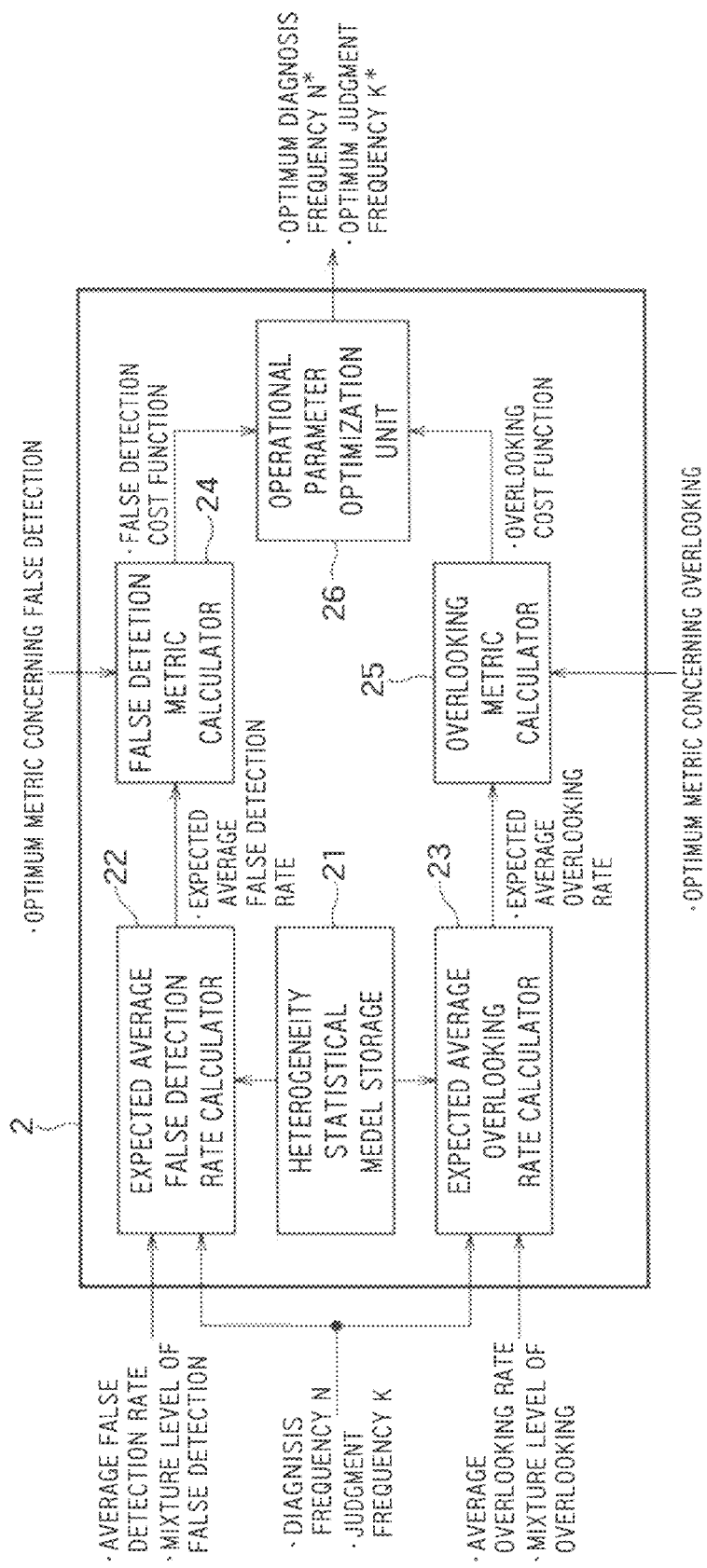
FIG. 15 is a block diagram showing the structure of an operational parameter determiner.

FIG. 15 is a block diagram showing the structure of the operational parameter determiner 2.

The operational parameter determiner 2 is inputted with: the diagnosis frequency N and the judgment frequency K set by the coverage evaluator 5; average false detection rate, bias level of false detection, average overlooking rate, and bias level of overlooking outputted from the diagnostic logic bias calculator 1; and two optimization metric functions (concerning false detection/overlooking) inputted by a user (owner or management department of the building). The operational parameter determiner 2 outputs the optimum diagnosis frequency N* and the optimum judgment frequency K*.

The operational parameter determiner 2 derives operational parameters (diagnosis frequency N* and judgment frequency K*, note that "abnormality is judged only when the diagnosis result is abnormal K* or more times when performing diagnostic logic N* times") for minimizing (or maximizing) the total of the two optimization metric functions inputted from the optimization metric function input unit 4. For example, an optimization metric function for calculating maintenance cost (metric) and an optimization metric function for calculating damage cost (metric) are inputted to minimize the total cost (optimization metric) of the maintenance cost and damage cost. In this way, the object of reducing maintenance cost can be achieved even when the diagnostic logic is a low-performance type having difficulty in achieving the object by performing diagnosis one time.

<Expected Average False Detection Rate Calculator>

An expected average false detection rate calculator (rate calculator) 22 substitutes the inputted K, N, $p_{FP}$, and $M_{FP}$ for a heterogeneity statistical model concerning false detection to obtain an expected average false detection rate (real scalar value of 0 to 1).

Beta binomial distribution is known as a heterogeneity statistical model. The heterogeneity statistical model is stored in a heterogeneity statistical model storage 21.

The average false detection rate $p_{FP}$ and the bias level of false detection $M_{FP}$ are outputted from the diagnostic logic bias calculator 1, and K and N are natural scalar values sequentially given from the coverage evaluator 5.

$$g_{FP}(K \mid N, p_{FP}, M_{FP}) = \int \Phi(K \mid p, N) B(p \mid M_{FP}, p_{FP}) dp$$
$$= {}_N C_K B(p_{FP}(1-M_{FP})/M_{FP}) + K,$$
$$(1-p_{FP})(1-M_{FP})/M_{FP}) + N - K)/$$
$$B(p_{FP}(1-M_{FP})/M_{FP}),$$
$$(1-p_{FP})(1-M_{FP})/M_{FP}))$$

Here, B is a beta function.

<Expected Average Overlooking Rate Calculator>

The expected average false detection rate calculator 22 substitutes the inputted K, N, $p_{FN}$, and $M_{FN}$ for a heterogeneity statistical model concerning overlooking to obtain an expected average overlooking rate (real scalar value of 0 to 1). The average overlooking rate $p_{FN}$, and the bias level of overlooking $M_{FN}$ are outputted from the diagnostic logic bias calculator 1, and K and N are natural scalar values sequentially given from the coverage evaluator 5.

$$g_{FN}(K \mid N, p_{FN}, M_{FN}) = \int \Phi(K \mid p, N) B(p \mid M_{FN}, p_{FN}) dp$$
$$= {}_N C_K B(p_{FN}(1-M_{FN})/M_{FN}) + K,$$
$$(1-p_{FN})(1-M_{FN})/M_{FN}) + N - K)/$$
$$B(p_{FN}(1-M_{FN})/M_{FN}),$$
$$(1-p_{FN})(1-M_{FN})/M_{FN}))$$

Here, B is a beta function.

<False Detection Metric Calculator>

A false detection metric calculator 24 substitutes the expected average false detection rate for an optimization metric function (first optimization metric function) serving as a function formula concerning false detection set by the optimization metric function input unit 4, in order to convert it into a false detection metric value (scalar). Maintenance cost, which is one type of false detection metric (first metric), is given by the following formula, for example.

Maintenance cost=(((number of sensors)×(average failure rate))+(number of sensors)×(1−(average failure rate))×(expected average false detection rate))×(unit price)

It is assumed that the optimization metric function is inputted by a management operator. In this case, the number of sensors is inputted in accordance with design specifications, and the average failure rate is inputted as an assumed value based on the previous maintenance history, lifetime analysis, or experience. Maintenance cost increases as the frequency of false detection increases, which increases the frequency of unnecessarily calling out the maintenance staff.

<Overlooking Metric Calculator>

An overlooking metric calculator 25 substitutes the expected average overlooking rate for an optimization metric function (second optimization metric function) serving as a function formula concerning overlooking set by the optimization metric function input unit 4, in order to convert it into an overlooking metric value (scalar). Loss cost, which is one type of overlooking metric (second metric), is given by the following formula, for example.

Loss cost=(loss coefficient)×(number of sensors)× (average failure rate)×(expected average overlooking rate)×(unit price)

It is assumed that the optimization metric function is inputted by a management operator. In this case, the number of sensors is inputted in accordance with design specifications, and the average failure rate is inputted as an assumed value based on the previous maintenance history, lifetime analysis, or experience. Damage cost increases as the frequency of overlooking increases, which increases complaints about the abnormality of the sensor.

<Operational Parameter Optimization Unit>

An operational parameter optimization unit 26 determines the diagnosis frequency N* and the judgment frequency K* for maximizing diagnosis performance. This corresponds to an optimization problem to obtain N* and K* for minimizing the total cost (=maintenance cost+loss cost) when changing N and K. The operational parameter optimization unit 26 calculates the total cost (optimization metric) of each pair of N and K sequentially given from the coverage evaluator 5, and employs N and K leading to the minimum total cost. In this case, maintenance cost and loss cost are weighted by the same (value 1), but different weight values W1 and W2 may be used to calculate the total cost based on [W1×maintenance cost+ W2×loss cost]. A block including the functions of the false detection metric calculator 24 and the overlooking metric calculator 25 and the function of the operational parameter optimization unit 26 for calculating the above weighted sum corresponds to a metric calculator.

Figure 16A:
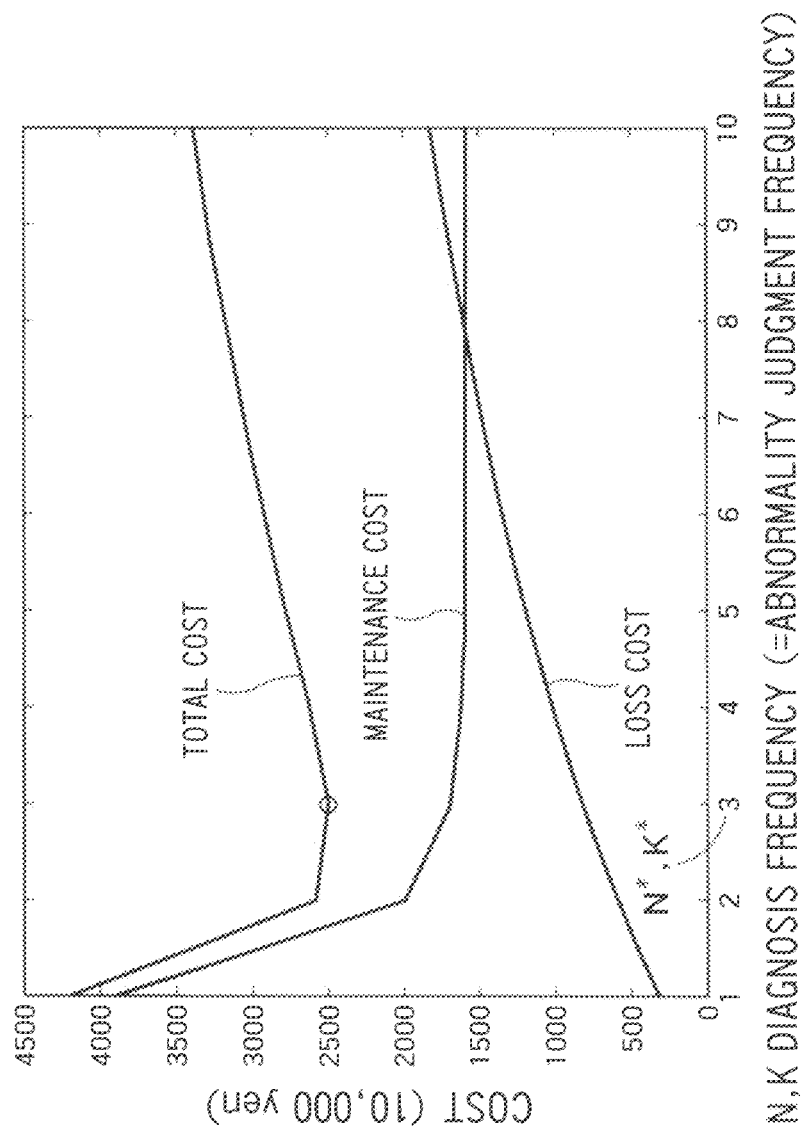
FIG. 16A is a graph showing the loss cost, maintenance cost, and total cost when the restriction of N=K is given.

FIG. 16A is a graph showing the loss cost, maintenance cost, and total cost when the restriction of N=K is given. In this example, the total cost is minimum when N=K=3. That is, the total cost becomes minimum in the case where abnormality is judged if abnormality is detected 3 times in succession when making diagnosis 3 times.

Figure 16B:
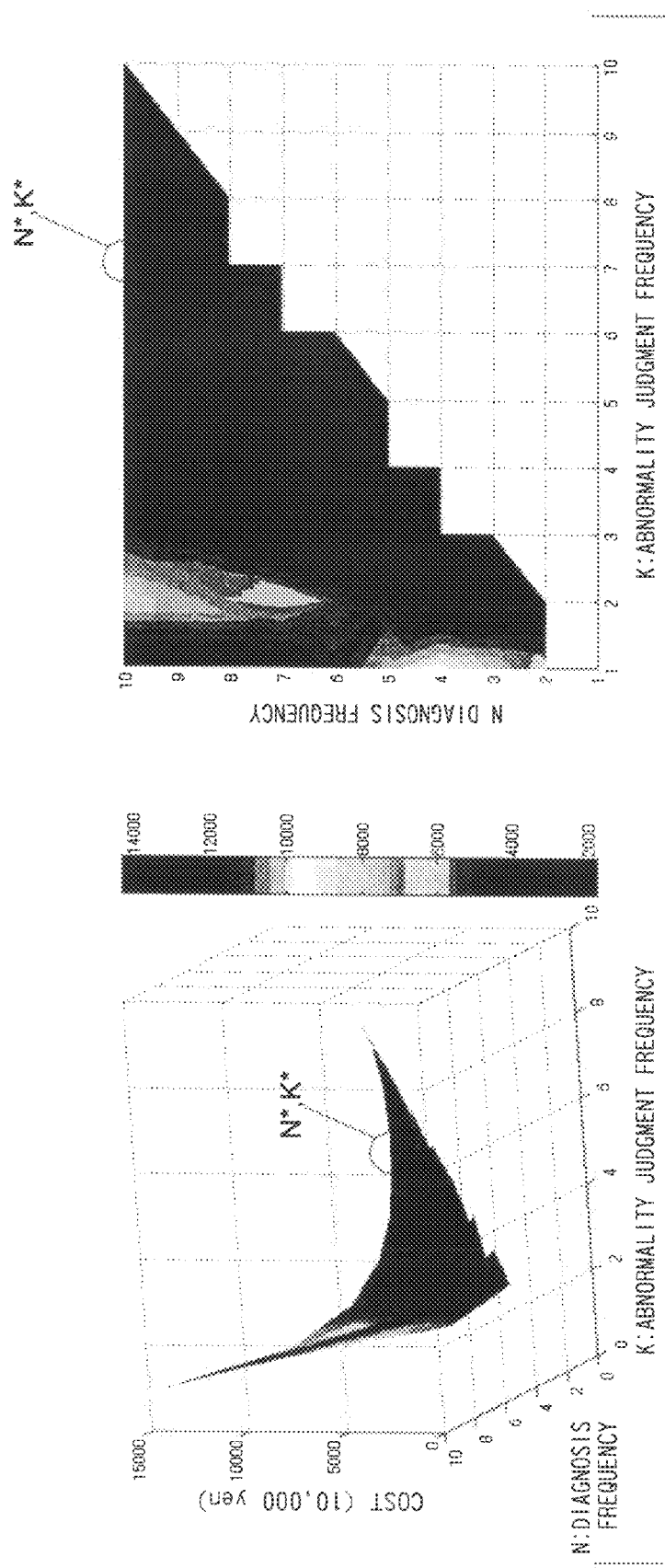
FIG. 16B is a graph showing the total cost when the restriction of N=K is not given.

Further FIG. 16B is a graph showing the total cost when the restriction of N=K is not given. In this example, the total cost is minimum when N=10 and K=7. That is, the total cost becomes minimum in the case where abnormality is judged if abnormality is judged 7 or more times when making diagnosis 10 times.

Here, N and K are selected to minimize the total cost, but N and K may be arbitrarily selected so that the total cost becomes a threshold value or less.

As stated above, in the present embodiment, frequency (N and K) necessary for judgment can be appropriately determined, and thus the frequency of false warning and overlooking can be effectively minimized. There is a problem that expected effect cannot be obtained when N and K have inappropriate values, which increases false warning and overlooking of warnings. However, in the present embodiment, N and K can be automatically optimized by diagnosis result data and inspection result data, and thus false warning and overlooking can be effectively minimized.

Note that the abnormality diagnosis filter generator explained in FIG. 1 can be realized by using a general computer device as basic hardware, for example. That is, each element included in the abnormality diagnosis filter generator may be realized by letting a computer carry out a program describing instructions of each process. In this case, the abnormality diagnosis filter generator can be realized by previously installing the above program in the computer device or by properly installing, in the computer device, the above program stored in a storage medium such as hard disk, memory device, optical disk, etc. or distributed through the network. Further, each storage can be realized by properly using a storage medium such as internal/external memory or hard disk of the above computer device, CD-R, CD-RW, DVD-RAM, DVD-R, etc.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. An abnormality diagnosis filter generator determining values of N and K for an abnormality diagnostic logic which makes a diagnosis N (an integer of 2 or greater) times with respect to each diagnosis target by using observation values collected from the diagnosis targets, and generates a diagnosis result showing that the diagnosis target is abnormal if the diagnosis target is judged to be abnormal K (an integer of N or less) or more times when making the diagnosis N times, comprising:
   a first storage configured to store diagnosis result data showing whether each of the diagnosis targets is abnormal or normal with respect to each of a plurality of first times;
   a second storage configured to store inspection result data showing whether each of the diagnosis targets is abnormal or normal, the inspection result data being obtained by performing maintenance inspection on the diagnosis targets with respect to at least one second time;
   a diagnostic logic bias calculator configured to:
      (A-1) generate false detection reliability feedback data showing a probability that each diagnosis result of the diagnosis result data is abnormal due to false detection, and overlooking reliability feedback data showing a probability that each diagnosis result of the diagnosis result data is abnormal due to overlooking, the false detection reliability feedback data and the overlooking reliability feedback data being generated depending on a time difference between each of the first times of the diagnosis result data and the second time of the inspection result data;
      (A-2) update, based on the false detection reliability feedback data, hyperparameters of a statistical model which includes, as the hyperparameters, a common diagnosis performance $\beta_{fp}$ concerning false detection, and a standard deviation $\sigma_{fp}$ of an individual diagnosis performance $\gamma_{fp}$ concerning false detection, and calculate, from the updated hyperparameters, an average false detection rate $P_{FP}$ showing an average probability of false detection, and a bias level of false detection $M_{FP}$; and
      (A-3) update, based on the overlooking reliability feedback data, hyperparameters of a statistical model which includes, as the hyperparameters, a common diagnosis performance $\beta_{fn}$ concerning overlooking, and a standard deviation $\sigma_{fn}$ of an individual diagnosis performance $\gamma_{fn}$ concerning overlooking, and calculate, from the updated hyperparameters, an average overlooking rate $P_{FN}$ showing an average probability of overlooking, and a bias level of overlooking $M_{FN}$; and
   an operational parameter determiner configured to:
      (B-1) calculate an expected average false detection rate of the abnormality diagnostic logic from a heterogeneity statistical model defined by the average false detection rate, the bias level of false detection, and the values of N and K, and calculate an expected average overlooking rate of the abnormality diagnostic logic from a heterogeneity statistical model defined by the average overlooking rate, the bias level of overlooking, and the values of N and K, each calculation being performed with respect to each combination of the values of N and K;
      (B-2) calculate an optimization metric from the expected average false detection rate and the expected average overlooking rate; and
      (B-3) select a pair of N and K so that the optimization metric becomes a predetermined one of minimum or maximum.

2. An abnormality diagnosis filter generator determining values of N and K for an abnormality diagnostic logic which makes a diagnosis N (an integer of 2 or greater) times with respect to each diagnosis target by using observation values collected from the diagnosis targets, and generates a diagnosis result showing that the diagnosis target is abnormal if the diagnosis target is judged to be abnormal K (an integer of N or less) or more times when making the diagnosis N times, comprising:
   a first storage configured to store diagnosis result data showing whether each of the diagnosis targets is abnormal or normal with respect to each of a plurality of first times;
   a second storage configured to store inspection result data showing whether each of the diagnosis targets is abnormal or normal, the inspection result data being obtained by performing maintenance inspection on the diagnosis targets with respect to at least one second time;
   a feedback data generator configured to generate false detection reliability feedback data showing a probability that each diagnosis result of the diagnosis result data is abnormal due to false detection, and overlooking reliability feedback data showing a probability that each diagnosis result of the diagnosis result data is abnormal due to overlooking, the false detection reliability feedback data and the overlooking reliability feedback data being generated depending on a time difference between each of the first times of the diagnosis result data and the second time of the inspection result data, based on the diagnosis result data and the inspection result data;
   a diagnosis performance calculator configured to:
      obtain $\beta_{fp}$, $\sigma_{fp}$, and an expected value $E(\gamma_{fp})$ of the $\gamma_{fp}$ by solving a statistical model based on maximum likelihood estimation or Markov chain Monte Carlo methods using the false detection reliability feedback data, the statistical model defining posterior distribution of the $\beta_{fp}$, the $\gamma_{fp}$, and the $\sigma_{fp}$ which are hyperparameters, the $\beta_{fp}$ being a common diagnosis performance concerning false detection, and the $\sigma_{fp}$ being a standard deviation of an individual diagnosis performance $\gamma_{fp}$ concerning false detection; and obtain $\beta_{fn}$, $\sigma_{fn}$, and an expected value $E(\gamma_{fn})$ of the $\sigma_{fn}$ by solving a statistical model based on the maximum likelihood estimation or the Markov chain Monte Carlo methods using the overlooking reliability feedback data, the statistical model defining posterior distribution of the $\beta_{fn}$, the $\gamma_{fn}$, and the $\sigma_{fn}$ which are hyperparameters, the $\beta_{fn}$ being a common diagnosis performance concerning overlooking, and the $\sigma_{fn}$ being a standard deviation of an individual diagnosis performance $\gamma_{fn}$ concerning overlooking;

a sample data generator configured to generate false detection sample data concerning the false detection based on the $\beta_{fp}$, the $\sigma_{fp}$, and the $E(\gamma_{fp})$, the false detection sample data showing a frequency of false diagnosis when the diagnosis target is diagnosed N times, and to generate, overlooking sample data concerning the overlooking based on the $\beta_{fn}$, the σfn, and the $E(\gamma_{fn})$, the overlooking sample data showing a frequency of false diagnosis when the diagnosis target is diagnosed N times;

a bias calculator configured to calculate a average false detection rate $P_{FP}$ showing an average probability of false detection, an average overlooking rate $P_{FN}$ showing an average probability of overlooking, bias level of the false detection $M_{FP}$, and bias level of the overlooking $M_{FN}$, the calculation being performed based on the false detection sample data and the overlooking sample data;

a rate calculator configured to calculate an expected average false detection rate of the abnormality diagnostic logic from a heterogeneity statistical model defined by the average false detection rate, the bias level of false detection, and the values of N and K, and to calculate an expected average overlooking rate of the abnormality diagnostic logic from a heterogeneity statistical model defined by the average overlooking rate, the bias level of overlooking, and the values of N and K, each calculation being performed with respect to each combination of the values of N and K;

a metric calculator configured to calculate an optimization metric from the expected average false detection rate and the expected average overlooking rate; and an operational parameter optimization unit configured to select the pair of N and K so that the optimization metric becomes a predetermined one of minimum or maximum.

3. The device of claim 2, wherein the heterogeneity statistical model is a $\beta$ binomial distribution.

4. The device of claim 2, further comprising:
a model storage configured to store the $\beta_{fp}$, the $\sigma_{fp}$, the $E(\gamma_{fp})$, the ($\beta_{fn}$, the $\sigma_{fn}$, and the $E(\gamma_{fn})$; and
a model verifier configured to:
calculate a likelihood $L_{fp}$, which is a maximum likelihood of achieving a state of the false detection reliability feedback data with respect to the $\beta_{fp}$, the $\sigma_{fp}$, and the $E(\gamma_{fp})$ stored in the model storage;
calculate a likelihood $L_{fn}$, which is a maximum likelihood of achieving a state of the overlooking reliability feedback data with respect to the $\beta_{fn}$, the $\sigma_{fn}$, and the $E(\gamma_{fn})$ stored in the model storage; and
determining whether or not to update the ($\beta_{fp}$, the $\sigma_{fp}$, the $E(\gamma_{fp})$, the ($\beta_{fn}$, the $\sigma_{fn}$, and the $E(\gamma_{fn})$ in the model storage, based on the total of a logarithm of the likelihood $L_{fp}$ and a logarithm of the likelihood $L_{fn}$,
wherein when the model verifier determines to carry out updating, the diagnosis performance calculator calculates the ($\beta_{fp}$, the $\sigma_{fp}$, the $E(\gamma_{fp})$, the ($\beta_{fn}$, the $\sigma_{fn}$, and the $E(\gamma_{fn})$, and updates content of the model storage by the ($\beta_{fp}$, the $\sigma_{fp}$, the $E(\gamma_{fp})$, the $\beta_{fn}$, the $\sigma_{fn}$, and the $E(\gamma_{fn})$ calculated.

5. The device of claim 2,
wherein maintenance cost caused by performing maintenance inspection on the diagnosis target is calculated by calculating a first optimization metric function having the expected average false detection rate as an input parameter,
loss cost caused by not performing maintenance inspection on the diagnosis target which is actually abnormal is calculated by calculating a second optimization metric function having the expected average overlooking rate as an input parameter, and
the pair of N and K is selected so that the total cost of the maintenance cost and the loss cost becomes minimum or a threshold value or less.

\* \* \* \* \*